United States Patent
Wang et al.

(10) Patent No.: US 10,242,225 B2
(45) Date of Patent: Mar. 26, 2019

(54) SYSTEMS AND METHODS FOR FACILITATING RELATIONSHIP MANAGEMENT

(71) Applicant: PrivateTree, LLC, Fremont, CA (US)

(72) Inventors: Edward F. Wang, Union City, CA (US); Timothy N. Jones, Oakland, CA (US)

(73) Assignee: PrivateTree, LLC, Fremont, CA (US)

( * ) Notice: Subject to any disclaimer, the term of this patent is extended or adjusted under 35 U.S.C. 154(b) by 881 days.

(21) Appl. No.: 14/298,873

(22) Filed: Jun. 6, 2014

(65) Prior Publication Data

US 2014/0282952 A1 Sep. 18, 2014

Related U.S. Application Data

(63) Continuation of application No. 13/140,813, filed as application No. PCT/US2009/068847 on Dec. 18, 2009, now Pat. No. 8,782,151.

(51) Int. Cl.
*G06F 15/16* (2006.01)
*G06F 21/62* (2013.01)
(Continued)

(52) U.S. Cl.
CPC ......... *G06F 21/6245* (2013.01); *G06Q 10/10* (2013.01); *H04L 51/00* (2013.01); *H04L 63/083* (2013.01); *H04L 63/18* (2013.01)

(58) Field of Classification Search
CPC ......... G06Q 10/10; H04L 63/18; H04L 51/00; H04L 63/083; G06F 21/6245
See application file for complete search history.

(56) References Cited

U.S. PATENT DOCUMENTS 6,178,508 B1 * 1/2001 Kaufman ................ G06F 21/40
713/183
7,013,389 B1 * 3/2006 Srivastava ............ H04L 9/0822
713/163

(Continued)

OTHER PUBLICATIONS

International Search Report and Written Opinion dated Feb. 2, 2010, from the International Searching Authority, or International Patent Application No. PCT/US09/68847(filed Dec. 18, 2009), 7 pages.

*Primary Examiner* — Douglas B Blair
(74) *Attorney, Agent, or Firm* — Ascenda Law Group, PC

(57) ABSTRACT

Messages exchanged among users of a relationship management and work collaboration system are organized within user-defined, secure communication channels organized according to user-defined hierarchies that represent the users' personal relationships with one another. Security of the communications channels is maintained using individual, dynamic keys, each of the keys being uniquely associated with a respective one of the channels, and being generated according to combinations of individual passwords established by each respective channel's participants. In-bound messages in the form of e-mails are received and associated with respective ones of the channels according to e-mail aliases associated with the inbound messages. Outbound e-mails may be sent to channel participants according to e-mail addresses associated with the participants and channel preferences established by the system users. In some instances, messages are posted or not posted to those of the channels under the control of respective moderators and channel participants.

1 Claim, 15 Drawing Sheets

(51) Int. Cl.
*G06Q 10/10* (2012.01)
*H04L 29/06* (2006.01)
*H04L 12/58* (2006.01)

(56) References Cited

U.S. PATENT DOCUMENTS

| | | | |
|---|---|---|---|
| 7,366,759 B2 | 4/2008 | Trevithick et al. | |
| 7,434,046 B1 * | 10/2008 | Srivastava | H04L 9/0825 380/264 |
| 8,033,459 B2 | 10/2011 | Senez, Jr. | |
| 8,346,864 B1 * | 1/2013 | Amidon | H04L 65/1069 709/204 |
| 8,503,679 B2 | 8/2013 | Bugbee | |
| 8,782,151 B2 * | 7/2014 | Wang | G06Q 10/10 709/206 |
| 9,449,091 B1 * | 9/2016 | Rao | G06F 17/30861 |
| 2001/0027519 A1 * | 10/2001 | Gudbjartsson | G06Q 20/383 713/168 |
| 2005/0044356 A1 * | 2/2005 | Srivastava | H04L 9/0827 713/163 |
| 2006/0230061 A1 | 10/2006 | Sample et al. | |
| 2006/0271784 A1 * | 11/2006 | Bolosky | G06Q 10/107 713/170 |
| 2008/0089517 A1 * | 4/2008 | Bianco | G06F 12/1466 380/259 |
| 2008/0114847 A1 | 5/2008 | Ma et al. | |
| 2008/0154622 A1 * | 6/2008 | El Kadri | G06F 21/6245 705/20 |
| 2008/0172391 A1 | 7/2008 | Adelman et al. | |
| 2008/0205655 A1 | 8/2008 | Wilkins et al. | |
| 2008/0228887 A1 | 9/2008 | Robertson et al. | |
| 2009/0063613 A1 * | 3/2009 | Chijiiwa | G06Q 10/10 709/202 |
| 2009/0157717 A1 | 6/2009 | Palahnuk et al. | |
| 2011/0131406 A1 * | 6/2011 | Jones | H04L 65/1053 713/150 |

* cited by examiner

SYSTEMS AND METHODS FOR FACILITATING RELATIONSHIP MANAGEMENT

RELATED APPLICATIONS

This application is a CONTINUATION of U.S. patent application Ser. No. 13/140,813, filed Sep. 6, 2011 (now issued as U.S. Pat. No. 8,782,151), incorporated herein by reference, which is a NATIONAL STAGE under 35 USC 371 of International Application PCT/US2009/068847, filed 18 Dec. 2009, which claims priority to and incorporates by reference U.S. Provisional Patent Application No. 61/139,549, filed 19 Dec. 2008.

FIELD OF THE INVENTION

The present invention relates to methods and systems for facilitating relationship management and work collaboration through organizations of virtual constructs representing such relationships and communications between individuals involved in same.

BACKGROUND

So-called social networking and online collaboration Web sites have become very popular among users of the Internet. Although differences exist, most of these sites allow users some form of self-expression (e.g., identifying likes, dislikes, interests, displaying photos, videos, etc.) and provide facilities for users to exchange correspondence with one another. As such, these virtual communities seek to emulate physical world social organizations in which users of a community are tied together by shared interests, business, friendship, kin, or other relationships.

A common failing of these conventional social networking sites, however, is that the need to monetize the operation of the site inevitably leads to an eroding of its individual users' privacy. And, any privacy that is given is limited at the boundary of the website being used, as data encryption for customer data makes it hard to develop and maintain software and provide customer service. Users' contact lists, communication threads, and profiles are fertile grounds for advertisers and retailers seeking to drum up business and operators of social networking sites have taken to selling access to such information in exchange for revenue. In cases where users are permitted to opt out of such programs, the volume of personal information that is readily displayed to anyone who cares to review individual user profiles can be staggering, particularly from the standpoint of information available to employees of the service entity. Because the information exists in electronic form, it is easy to copy and transport and so can easily wind up in the wrong hands. At times it seems like an entire generation has freely ceded access to what has traditionally been considered private information.

Another common problem that surrounds conventional social networking and online collaboration sites is that each represents its own walled garden. Sites compete with one another for user attention and allow little, if any, portability and interoperability for user profiles and content. Presently, interoperability between users of these different websites is dictated by business agreements, and often, the business entities do not cooperate even in these agreements to benefit the users. As a result, users often create profiles at many different social network sites. Yet, they cannot create their own use case easily, and users have been forced to adopt multiple services and multiple accounts within a service for different facets of their lives, be it work or personal. This creates multiple communication streams that users must continually monitor in order to keep abreast of their friends' activities.

SUMMARY OF THE INVENTION

In various embodiments, the present invention provides systems and methods for organizing messages and data exchanged among users of a relationship management system within user-defined, secure communication channels organized according to user-defined hierarchies that represent a user's personal categorization of his/her relationships with others. Security of the communications channels is maintained using individual, dynamic keys, each of the keys being uniquely associated with a respective one of the channels, and being generated according to combinations of individual passwords established by each respective channel's participants. In-bound messages in the form of e-mails are received and associated with respective channel participants according to e-mail aliases associated with the inbound messages that point to the target channel. Outbound e-mails may be sent to channel participants according to e-mail addresses associated with the participants and channel preferences established by the system users. In some instances, messages are posted or not posted to channels under the control of respective channel moderators. Users may view and access the channels through a hierarchical organization thereof. This hierarchical view is dynamic and user-customizable to fit the changes in a user's priorities. It also automatically sorts the data according the channels.

BRIEF DESCRIPTION OF THE DRAWINGS

The present invention is illustrated by way of example, and not limitation, in the figures of the accompanying drawings, in which.

DETAILED DESCRIPTION

Figure 1:
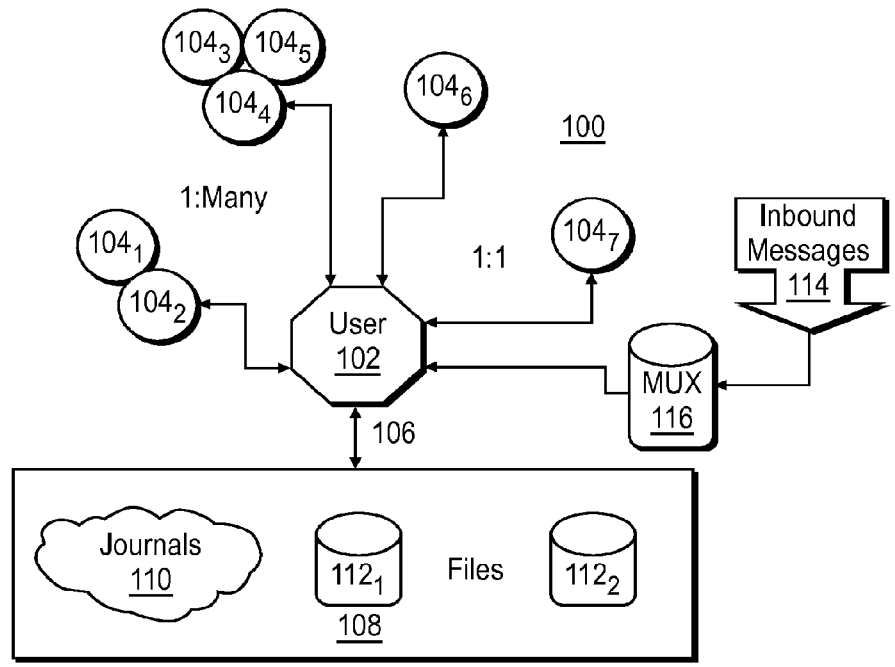
FIG. 1 illustrates a conceptual view of a system for facilitating relationship management configured in accordance with the present invention.

The loss of privacy and the sometimes-overwhelming stream of communications via e-mail and multiple parallel channels have led to a sense of helplessness among users of e-mail, social networking, and collaboration sites. Many users are unable to focus their attention for long periods of time, because they feel the need to be continually checking their different communication channels for the latest messages. At the same time, advertisers and retailers with access to these users' personal information flood the communication channels with targeted messages in an attempt to sell products and services which the users' profiles suggest they may desire. As a result, many users feel lost in a sea of digital communications and virtual communities.

The present invention addresses the needs of users to build and maintain meaningful and productive relationships with themselves and others, while allowing users to control the communication paths through which these relationships develop. Instantiated, in one embodiment, as a server-based system accessible via a Web browser or other client, the present invention provides means for individual users to create and manage their relationships as a collection of communication Channels, grouped according to the user's preferences, and viewed from the standpoint of the user as the center point of the collection of relationships. If the user is regarded as a software object (as represented by their Contact Record Object) having a variety of attributes, then relationships among users may be regarded as further objects (called Channels), also having their own attributes. Communications, or conversations, within the Channels may be represented as still further objects (called Content, Thread or Messages) with attributes of their own.

Before discussing aspects of the present invention in detail, the following Glossary describes terms used herein:

Alcove—Band: The Band Alcove is nested below the Root Alcove, and allows the user to see all the Channels in the types of relationships that they have defined in the Band.

Alcove—Catchall: The catchall in each Alcove contains every Channel Object that has not been assigned to that Alcove's Cells. In the case of the Root Alcove, the Catchall will also contain Bands that are not assigned to any Cells in the Root Alcove. A Catchall Alcove is a listing of overflow items in a Catchall, and each item can be used to access the appropriate Channels or Bands.

Alcove—Guest: The Guest Alcove is designed to restrict Guest accounts, to give Hosts greater privileges and resources to manage Guests. For example, Guest accounts may be limited to one Alcove (Guest). The Guest Alcove resembles a user's Alcoves (Root, Band, etc.), but can only contain a limited number of Channels. Guests do not have Band Alcoves.

Alcove—Root: The Root Alcove is the highest level of Alcove in a System Module. For example, for External Channels, it represents the highest level or organization of a person's Relationship Model. For User File System, the Root Alcove is the Desktop, where all Files and Folders are rooted. For Journals, it is the Journal Alcove.

Alcove Cell: An Alcove Cell is a node in an Alcove that represents a Band within the Alcove, or a Channel or SubChannel within the Alcove. Cells are organized in arrays in the Alcove to facilitate user absorption and contextual prioritization of information. The Cell will include the name of what is within the Cell, and the number of unread messages or items requiring attention within the Cell. Thus, the user can quickly prioritize how he or she spends time in his or her Relationship Model.

Alcove View: An interface for users to conveniently access their Bands and Channels.

Avatars: An Avatar is an online representation of a user. A user may have one Avatar for him/herself, and many others for different Channel Objects. These may be organized by Channel Trust Level or social context (e.g. casual, fun, warm, professional, etc.)

Bands: People are aggregated in Bands. Bands are, in human terms, the group categorization of people in our lives, such as Family, Friends, Colleagues, etc. We call these Bands to allow for generalization of data usage. Bands are attributes of the Channel Object.

Cards System: The Cards System allows users to send each other greeting cards. It consists of a mechanism for setting campaigns in parallel to the context of relationships, so that different people may receive different images, templates, salutations, address (to, for, dear, etc.), addressing name (Dr., Mr., Ms., etc.), body text, valedictions, and signatures.

Channel Application: A software application designed to work with the System Modules to enhance a user's ability to interact with his or her relationship Channels.

Channel Creator: The person who created a Channel Object. All subscribers to the software system who are not Guests may create Channels. Sometimes, Channel Creators are referred to as Channel Founders. A Channel Creator is by default the Channel Moderator, but that role and its powers may be later transferred to another Moderator. These include the deletion of a Channel Object, inviting users into the Channel Object, setting master control parameters for Channel Object behavior, etc.

Channel User: A Channel Object has participants, who are allowed secured access to the relationship embodiment and content vessel, which it represents. These Channel Users have different rights, depending on what the Channel Creator allows. In some cases, the Channel Creator can allow a democratic process on some Channel Object actions, or, it may be unilateral.

Channel Moderator: The Channel Moderator manages the permissions and behaviors that are enabled for the Moderator. If the Moderator is the Channel Creator, then the Moderator has all controls and rights.

Channel Object, sometimes referred to as Channel or Room: The Channel Object embodies the relationship between people, or the online communications medium, context, or room in which they meet. The Channel may include only one person (e.g., only the Channel Creator) where the Channel becomes a personal journal for its Channel Creator. Or, a Channel may include the Channel Creator and one other individual in a one-to-one private communication. Channels may also contain many people, in which case the Channel is a group Channel such as a club, small social circle, work group, or family circle. A Channel is both a link between people (e.g., a link to one's self in a journal, a link to another, and a link to many) but is a conduit that contains content. It may also contain other useful software objects, such as calendars or activity managers. The Channel Object has attributes, such as security keys, Channel Users, permissions, assigned Band, descriptions, logos, names assigned by the Channel Users from each of their own points of view, a mast name assigned by the Channel Creator, etc. It is thus a software object that can interact with other parts of the software system on behalf of the account holders who are participants of the Channel.

Channels—Virtual: These are Channel Views of user data, but they are not Channel Objects in themselves. Examples are aggregations of individual messages into a Virtual Channel in a chronological InBox, all drafts in progress in a Drafts box, or all messages in a Moderate box.

Channel View: A Channel View is a view of a sequence of messages in the Channel format, which is a sequential list of messages both expanded and compressed. These may be sorted in various ways such as by date, subject titles (threads), etc.

Configuration: The method by which a Channel Creator or Moderator controls the permissions of a Channel Object. A Channel User may also have permissions to Configure, which include his or her Avatar to the Channel Object, contact information, and whether the user chooses to leave the Channel.

Contact Channel/Trust: The Contact Channel/Trust information is an aggregation of all Channels Objects that are common between the user and the person represented by the Contact Record Object, and how the user trusts each Channel Object. That is, people trust groups differently depending on who is in each group.

Contact Database: The aggregate total of all the Contact Record Objects.

Contact History: The Contact History is an aggregate listing of history within the software system between the user and the person represented by the Contact Record Object. These include postings by the user and by the person represented by the Contact Record Object. The user may also post his or her personal notes on the represented person, which is secure and only seen by the user.

Contact Information: The Contact Information in the present system represents people and their contact information.

Contact Record Object, or Contact Record: The embodiment of an individual in the present system. The Contact Record is a software object that has attributes so that the represented individual can interact with the system in the overall architecture. These specifically include, for example, a main association (Main Category) in how an individual knows another person, Personal Trust Level, the Channels in which one may communicate with that person, and the history of those communications. Other more general contact attributes, or data within the object such as e-mails or telephone numbers, allow the system to develop automated context and associations to create communications in either e-mail or Channels.

Contact Record Status: The Status of the Contact Record Object is important to allow the user to move people in the user's life from New to Active to Archive, or other states. Combined with Personal and Channel Trust levels, this allows the user to simulate/model his or her relationship behavior and status according to how he/she normally conducts relationships. Thus, the Relationship Model can be more accurate to the state of a user's relationship preferences, allowing the user to manage better for him/her-self the subject relationship. The system may allow other states, and it can operate on the Status to remind and assist users in their relationships.

Content Object: A Content Object is any Native File or Message that has been created in the present system, and made into a software object with data attributes such as trust levels, tags, notes and attachments. Thus, a user can take his or her own content and encapsulate it with additional content or attributes. These Content Objects can then interact with the system to help users reuse their own content in different contexts, Channel Objects, or situations presented by the system.

Figure 17:
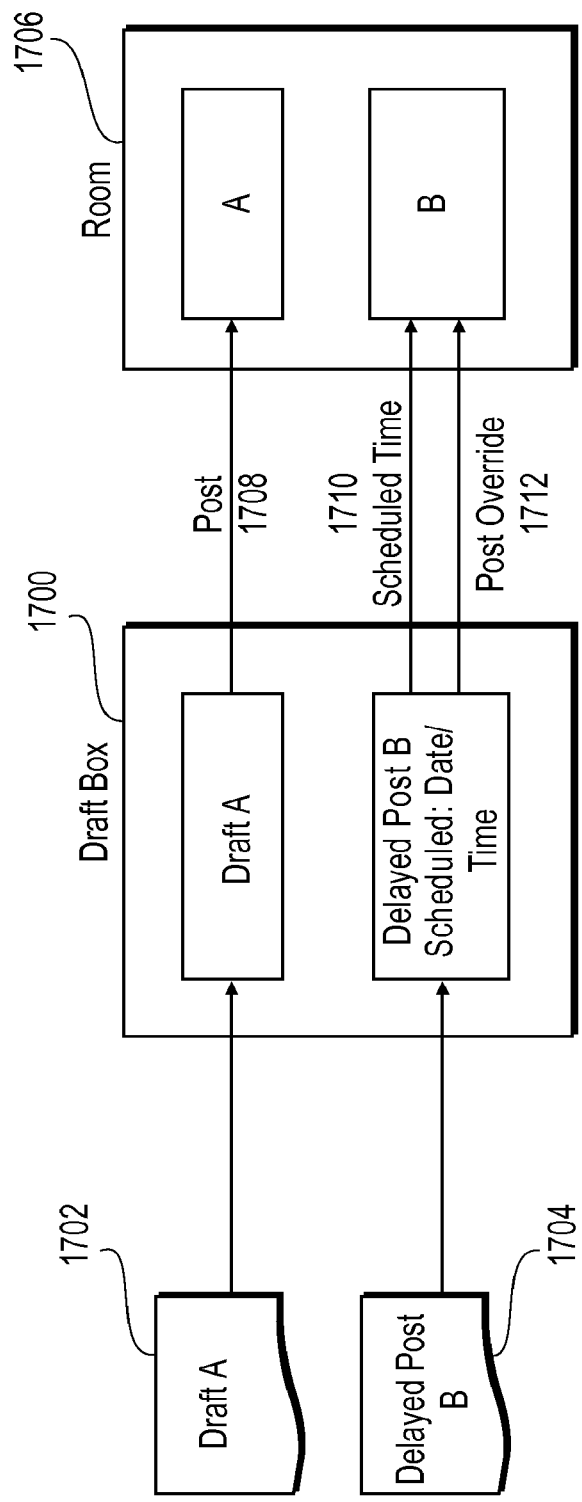
FIG. 17 illustrates an example of a Drafts Box according to an aspect of embodiments of the present invention.

Drafts Box: A Virtual Channel showing all un-submitted drafts created by a user (e.g., work in progress). FIG. 17 illustrates an example. A Draft Box 1700 acts as a repository for unfinished messages 1702, and messages scheduled for posting 1704, before they are posted to a Channel (Room) 1706. The posting may be direct 1708 once a draft message has been completed, or may be scheduled for a certain date/time 1710 when the user wants the content to appear in the Room. These scheduled posts may be overridden 1712 and posted directly upon user command.

E-mail Multiplexer (Mux): The E-mail Mux routes e-mails from Channel Objects to outside e-mail addresses and inbound e-mails to Channel Objects. This allows a user to administer his/her own communication routings to various devices.

External Channels: External Channels is the System Module that represents a user's external relationships in the real world. It includes the Root Alcove, the Band Alcoves, and the external Channel Objects that the user has created or in which he or she has become a Channel User.

Goal Manager: The Goal Manager is a System Module that helps users manage their own individual goals and tasks.

Guest: A Guest is a user invited by a Host to one of the Host's Channel Objects. Guests have limited rights on the system, but they are given the tools to communicate with Host users and their other hosted Channel Users.

Host: A Host is a user who has rights to create Channel Objects and invite other users to be Channel Users. Hosts may be aggregated within organizational entities (Organization.)

InBox: A Virtual Channel showing all unread messages in chronological order.

Journals Module: The Journals Module is a System Module that allows users to keep private, encrypted Journals.

Mastheads: Mastheads are the main user masthead and the Channel masthead. The main user masthead includes the user's personal Avatar and the system logo and control menus. Channel Mastheads contain Channel view controls and Channel information like Channel User membership list, Channel Avatar (or logo), participant Avatars, permissions, SubChannels available, Topics available, etc.

Message: A Message is the basic unit of communication in a System Module. It includes a title, body text, and, optionally, attachments.

Figure 20:
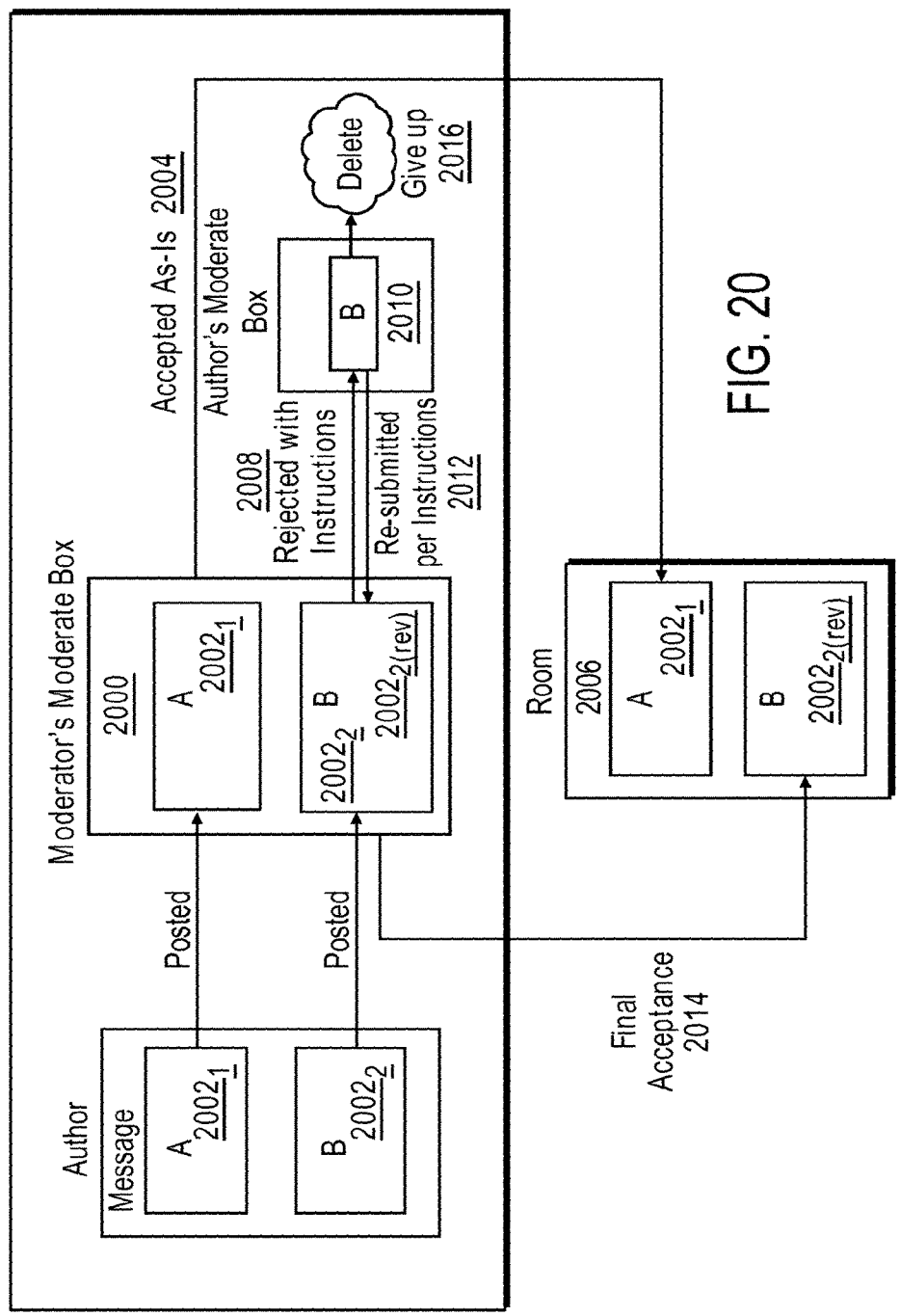
FIG. 20 illustrates an example of an example of a Channel Moderator's Moderate Box according to an aspect of embodiments of the present invention.

Moderate Box: A Virtual Channel showing all items to be moderated by the user. FIG. 20 shows an example of a Channel Moderator's Moderate Box 2000. Before messages 2002 are posted to a moderated room, the messages arrive in the Channel Moderator's Moderate Box for review. If accepted by the Moderator, the messages are posted 2004 as originally written to the room 2006. If the Channel Moderator deems the message to be unsuitable, it is returned 2008 to the author's Moderate Box 2010, optionally with instructions for revision or an explanation of the rejection. The author can revise and resubmit the message 2012, and this cycle may continue until the message is finally accepted by the Channel Moderator and posted 2014 to the room or the author abandons 2016 the message and deletes it.

Module: A module is a complete application environment that can be tied to the system to allow scalability in the application.

Module—System: A System Module is an instantiation of the system's use of the Alcoves, Bands and Channels to create application environments for the user that require modified specific uses of a user interface and the Channel Object system. Examples of System Modules are not limited to the External Channels, Journals, User File Systems, and Goals. System Modules may interact in an integrated manner with new Modules to be developed.

Native File: A Native File is an uploaded file native to another application. Examples of these are images in jpg format and documents in various formats.

OutBox: A Virtual Channel showing all user-posted messages in chronological order.

Organization: An Organization is an entity with master administrators and a collection of Hosts, who in turn host Guests either from within the Organization or external to the Organization.

Password Safe: The Password Safe is an area where a user can store, in an encrypted manner, all of his or her passwords. Passwords stored on the system are encrypted so that system administrators cannot access the passwords.

Publisher: The Publisher assists a user in publishing the user's Content Objects or Cards into Channel Objects and other distributions, such as e-mail, etc.

Reader: The Reader is the ChannelView or MessageView that allows a user to read his/her Channel Objects, Messages or Content Objects. The Reader may have different forms for different uses.

Relationship Model: The Relationship Model is a user's own use of the present system to model his/her own relationships with the people in his/her life (as represented in the model), with relationship linkages represented in the Channel Objects and their assigned Bands, and organized according to priority and context in the Alcoves (Root and Band).

RelationshipView: A three-dimensional view of the Channels in a user's Relationship Model.

Figure 19:
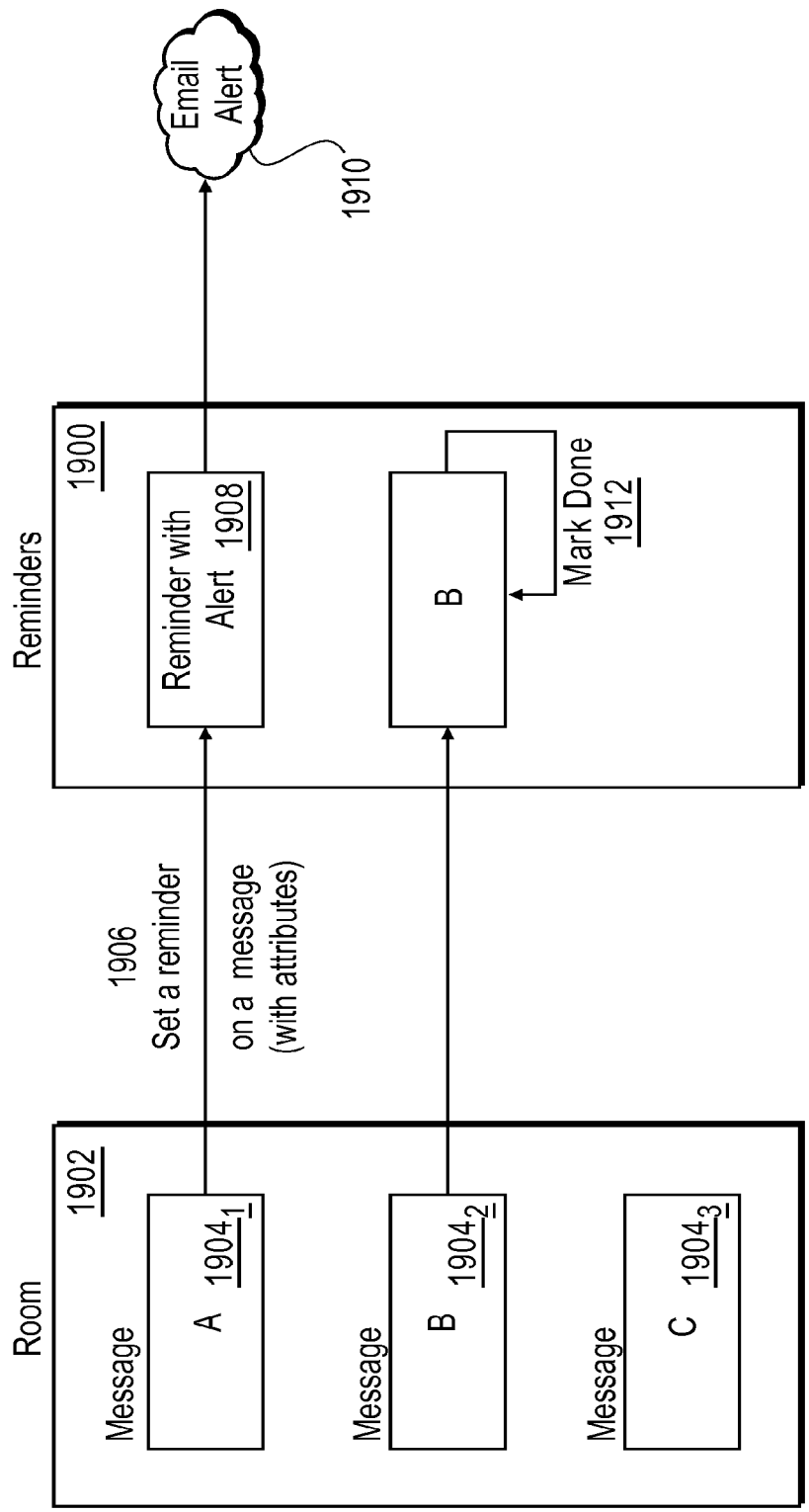
FIG. 19 illustrates an example of a Reminder Box according to an aspect of embodiments of the present invention.

Reminders Box: A Virtual Channel showing all reminders currently active. Reminders are for each user to remind himself/herself of actions required and can be attached to any Message. FIG. 19 shows an example of a Reminder Box 1900 for a Room 1902. Some (or all) messages 1904 within a Channel may have associated reminders set by a user to himself/herself 1906 (e.g., at the time of a post or thereafter) and these reminders 1908 may generate e-mail alerts 1910 to a user or all Channel Users, thus spurring action in connection with the associated message. When the action has been completed, the reminder may be marked as having been completed 1912. Alerts can be sent out either immediately, daily, weekly, or turned off. Alerts/reminders can be managed at an account level (in which case all rooms behave according to an established protocol) or at individual room level.

Rooms: A Channel Object that is used regularly, and thus has become a vibrant community of people. The Channel Users may choose to view a Room in a RoomView, which is a layer between the Alcove (Root or Band) and the Channel. Thus, the Room can be visualized on a computer display screen, and social operations can be managed from the RoomView to either access Channel Object functionality or the ChannelViews of messages within the Channel Object.

RoomView: A two-dimensional representation of a group of people in a Channel Object. From a view that includes Avatars of the Channel Users, users can view available messages and can choose to respond by dragging Avatars and other objects into active function areas such as "read message," "compose message," "e-mail," etc.

Skins/Themes: Skins/Themes are the look and feel of the system environment created for the user. These may be private to the user, or may include public facets of a user's Relationship Model.

SubChannel Object: A SubChannel Object, or SubChannel, is a subset of users of a Channel. It is a complete Channel Object in itself, and is assigned to the parent Channel Object. The SubChannel allows Channel Users to form private subgroups of people in larger groups.

TableView: A table of data with summary information, such as a list of names in contact list with phone numbers and e-mail addresses, or a series of messages with titles and other relevant information. It is a higher-level index view of the data being observed.

Thread: A series of messages, often with the same title, including an original posting and replies thereto.

Topics: Topics are common, recurring threads for Channel Objects, such as transactional items such as scheduling, deeper writings, photo collections, file collections, etc. that are appropriate to a Channel's purpose.

Trust Level—Channel: The level at which a person trusts a communications Channel (or group of people or room full of people.) These may have a number of different (e.g., five or more) user-definable levels.

Trust Level—Personal: The level at which a person trusts another. This is an attribute of the Contact Record Object. These may have a number of different (e.g., five or more) defined or user-definable levels.

User: A user, used alone outside the context of a Channel but in referring to the present system, is an account holder to the present system. The user may be a Host or a Guest, or a master administrator for an organization with many Hosts.

User File System: The User File System is a System Module that helps users manage their files in the form of Content Objects and Native Files.

Writer: The Writer allows a user to write content or attributes on top of Content Objects. It may take different forms for different uses, but it exists to create content and mark Content Objects with attributes such as tags, trust levels, etc.

Referring now to FIG. 1, a conceptual view of a system 100 configured in accordance with the present invention is illustrated. At the center of the system is an individual user 102. User 102 has many different relationships with other individuals or groups of individuals $104_1$-$104_7$ (where subscripts 1-7 indicate unique ones of said individuals). Some of those relationships are one-to-one, while others are oneto-many. An important relationship 106 is the user's relationship with him/her-self 108. This may be termed a one-to-zero relationship. The one-to-zero relationship may be codified in the form of journals 110, files $112_1$, $112_2$, or other records maintained by the user 102 for his/her own review. On occasion, portions of these records may be selected for release to others, either in their raw form or by way of other communications. This is the process of establishing relationships with others and allowing those relationships to grow over time.

The present system also facilitates control over inbound communications 114 (e.g., e-mails). In effect, the system acts as a communication multiplexer 116 by collecting many different inbound communication paths (both one-to-one and many-to-one) into multiple streams that can be organized according to the user's relationship mappings as represented by the user's Channels. That is, because the user is free to categorize his/her relationships as he/she sees fit, the system inherently filters communications between relationships along the lines of the designated relationships. These can be applied between and amongst individuals as well as entities such as organizations or companies. In one embodiment, incoming e-mails are automatically routed to respective Channels, and users see the arriving messages from their respective Alcoves, according to their Relationship Models.

Figure 2:
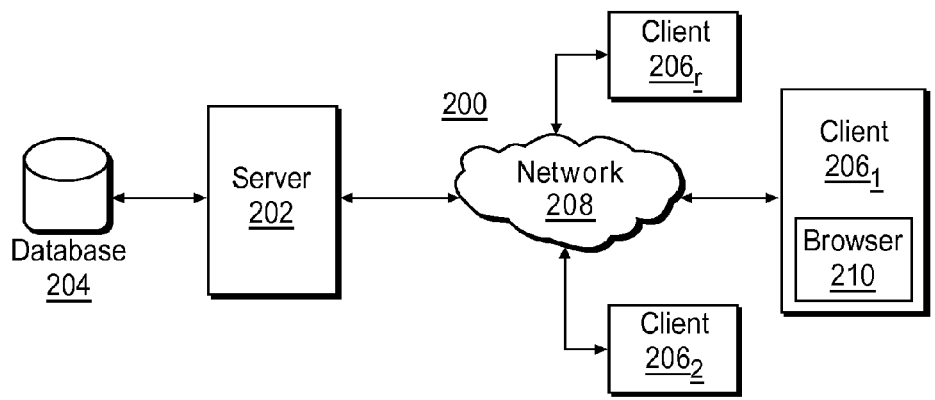
FIG. 2 illustrates an alternative view of the system shown in FIG. 1.

FIG. 2 presents a more conventional view of a system 200 configured according to an embodiment of the present invention. System 200 includes a server 202 on which software instantiations of the present invention execute. The server 202 is communicatively coupled to a database or other storage system 204 where user information and other data (as discussed below) are stored in a secure fashion. Any form of database can be used.

Server 202 is also communicatively coupled to many different clients $206_1$-$206_r$ via a network (or network of networks such as the Internet) 208. Individual clients 206 may be any form of platform (such as a personal computer, mobile phone, personal digital assistant, set-top box, video game system, etc). Users may access server 202 (i.e., an application program which is an instantiation of the present system running thereon) using conventional web browsers 210 executing on the clients 206 or via other client-based software applications. For sake of convenience, the operation of an application configured in accordance with the present invention and executing on server 202 will be described from the point of view of the user with reference to examples of user interfaces that facilitate the operations described herein.

Users may access the application at server 202 by logging in to an account, as is familiar to users of other server-based applications. Accounts may be created through independent registration, by invitation into a Channel, or in response to a viral campaign such as by receipt of a greeting card. Accounts are accessed in the conventional fashion, using a user name/password (or other challenge/response) combination. In cases other than user registration, users may receive access to "guest accounts", in which the user will have access to a Guest Alcove. Guests of the Host users may always have access to their "guest accounts" as long as their Hosts remain subscribers to the system.

In the case of registered (i.e., non-guest) users, following successful account activation, the system creates a Root Alcove for the user. The Root Alcove may be regarded as the user's "home page" and initially may be configured with a number of default Bands (e.g., Family, Clients, Weekend Fun, Work, Best Friends, Friends, My Cards, Personal Business, etc.). As discussed below, the Bands may be personalized by the user and represent collections of Channels, each of which represents a relationship, banded or collected under a common heading that is meaningful to the user. The Root Alcove may be regarded as a collection of Bands.

Figure 3:
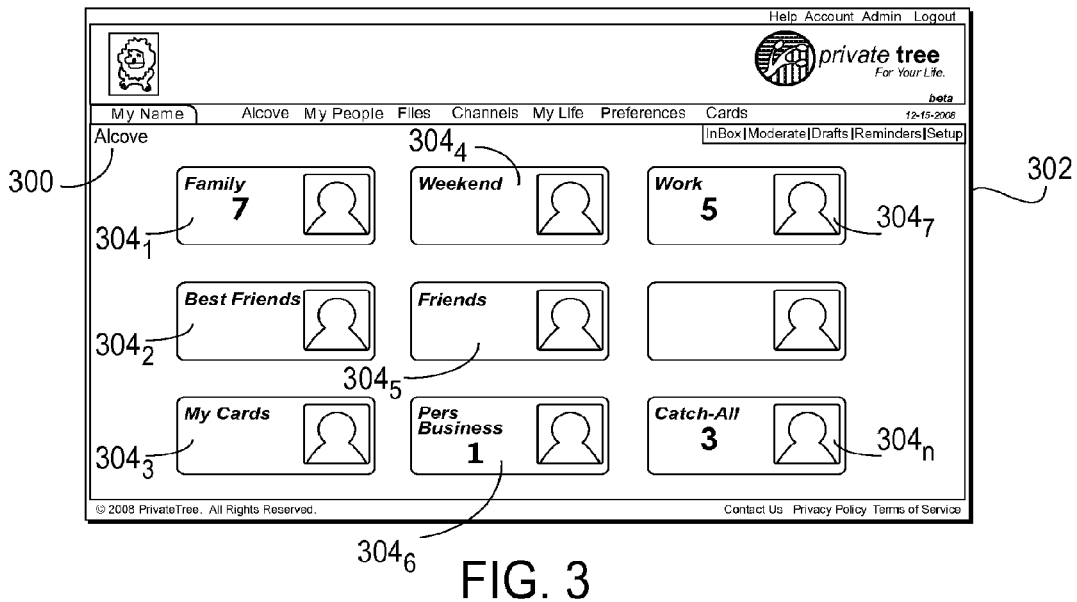
FIG. 3 illustrates an example of a Root Alcove according to an aspect of embodiments of the present invention.

Referring now to FIG. 3, a user's Root Alcove 300 may be represented in a user interface 302 (e.g., presented through the browser executing on the client used by the user) that contains a number of cells $304_1$-$304_n$, each of which allows access to specific Channels (or "rooms") or Bands. The Channels may be associated with one-to-one or one-to-many relationships between the user and other individuals or groups of individuals. In the illustrated example, an array of nine cells is illustrated, however, this is merely an example and other instantiations may include more or fewer cells, arranged in an array or in another fashion. In this example, eight of the cells are user-definable to contain Bands and Channels while a ninth cell, illustrated on the bottom right of the sample interface, is designated as an overflow or catchall bin where all unassigned Bands, and their associated Channels, or unassigned Channels are collected. The overall array of cells may be regarded as a model of a user's collective relationships with others (and, optionally, with him/her—self in the personal section of the account).

Bands may, in some instances, be regarded as classifications of the types of people in a user's life. Each Channel can have an assigned Band, but a Channel can also be unassigned. Channels, then, are the established links between people or groups of people in a user's Relationship Model. Each cell in the Root Alcove will contain Bands and Channel(s), wherein messages from such people can be collected and reviewed by the user. In one implementation, the cells may be highlighted to show how many unread messages are currently pending and the Avatar of the last person to post a message, so the user can quickly look over his/her Relationship Model and determine where his/her priorities lie with the time he/she has allocated to communicating with these various people in his/her life.

The Band Alcove: Upon selecting a cell representing a Band in the Root Alcove, a corresponding Band Alcove is presented for the user. In the example shown in FIG. 4, a user's family Band Alcove 400 is shown. Here are presented Channels $402_1$-$402_m$ for communication with the user's spouse, siblings, parents, in-laws and other family members. As before, an optional overflow or catchall cell may be present. In this example, the Channels are highlighted to show the number of pending, unread messages in each Channel. For example, there are five unread messages in the user's "spouse" Channel $402_1$ and two unread messages in the user's "mom & dad" Channel $402_2$. In this way, even a small collection of closely related people may organize all the one-to-one and one-to-subgroup permutations of a number of people in free relationships, all with different levels of trust and intimacy. The number of communication Channels may grow rapidly with the number of people in a community. This allows people to efficiently organize the many relationship linkages even in a small family, and thus open relationships efficiently and effectively.

Using the grid or array layouts shown in these examples, users can group multiple Bands and Channels within a Root Alcove, and multiple Channels within each Band Alcove, to have these communication portals available within a minimal number of cursor control operations (e.g., up to eight Bands and sixty-four Channels are available to a user within two mouse clicks) through the present interface. Of course, other interface layouts that permit access to more or fewer Bands and/or Channels may be used. Further, additional or fewer levels of Alcoves/Bands may be used to increase or decrease the complexity of the user's Relationship Model without increasing complexity of the overall interface.

Figure 5:
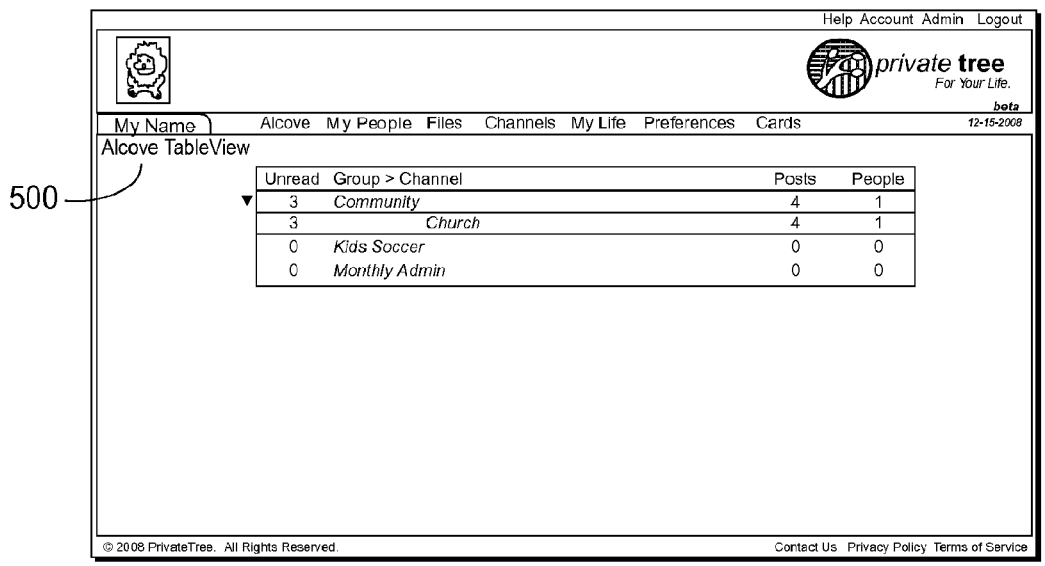
FIG. 5 illustrates an example of a Catchall Alcove according to an aspect of embodiments of the present invention.

The Catchall: As indicated above, each Alcove, Band, and/or other layer of the present interface is configured with a catchall (Catchall Alcove) that accommodates otherwise unassigned Channels or Bands. This allows the user to quickly see what Bands/Channels are not otherwise assigned and to better understand the overall configuration of his or her Relationship Model. FIG. 5 illustrates an example of a Catchall Alcove 500, which in this instance is being used as a placeholder for Bands/Channels related to "community", "church", "kid's soccer" and "monthly administration." These overflow catchalls may also be in grid layout form.

Creating a Channel or a Band: Channels are easily created independently or within Bands by using menu commands and/or wizards. The present system is configured to automatically allocate newly created Channels to the Band from which the user is presently creating a Channel. Alternatively, newly created Channels may be assigned to higher-layer Bands or Alcoves, for example the Root (or other designated) Alcove, to await further reassignment. Bands may be created within Alcoves in a similar fashion, or they may be created separately as they are category attributes for Channels.

Figure 4:
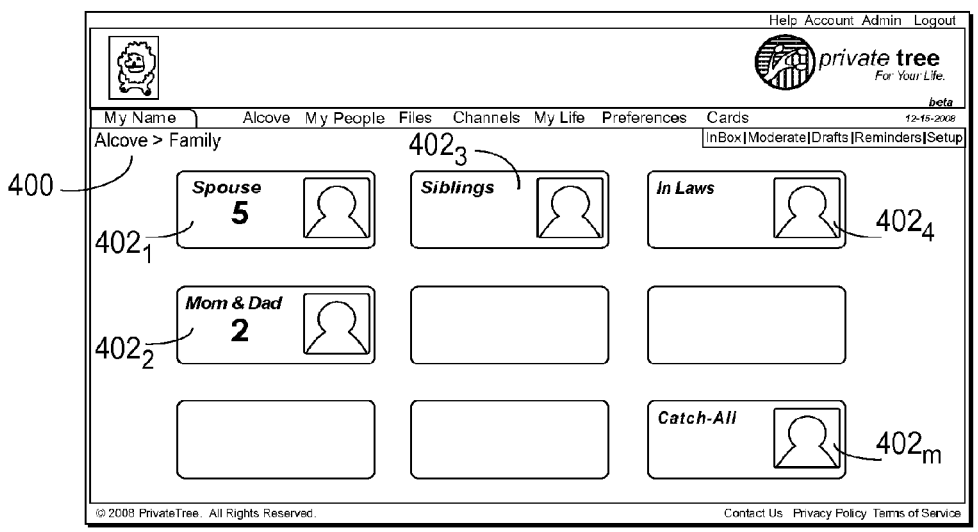
FIG. 4 illustrates an example of a user's family Band Alcove according to an aspect of embodiments of the present invention.
Figure 14:
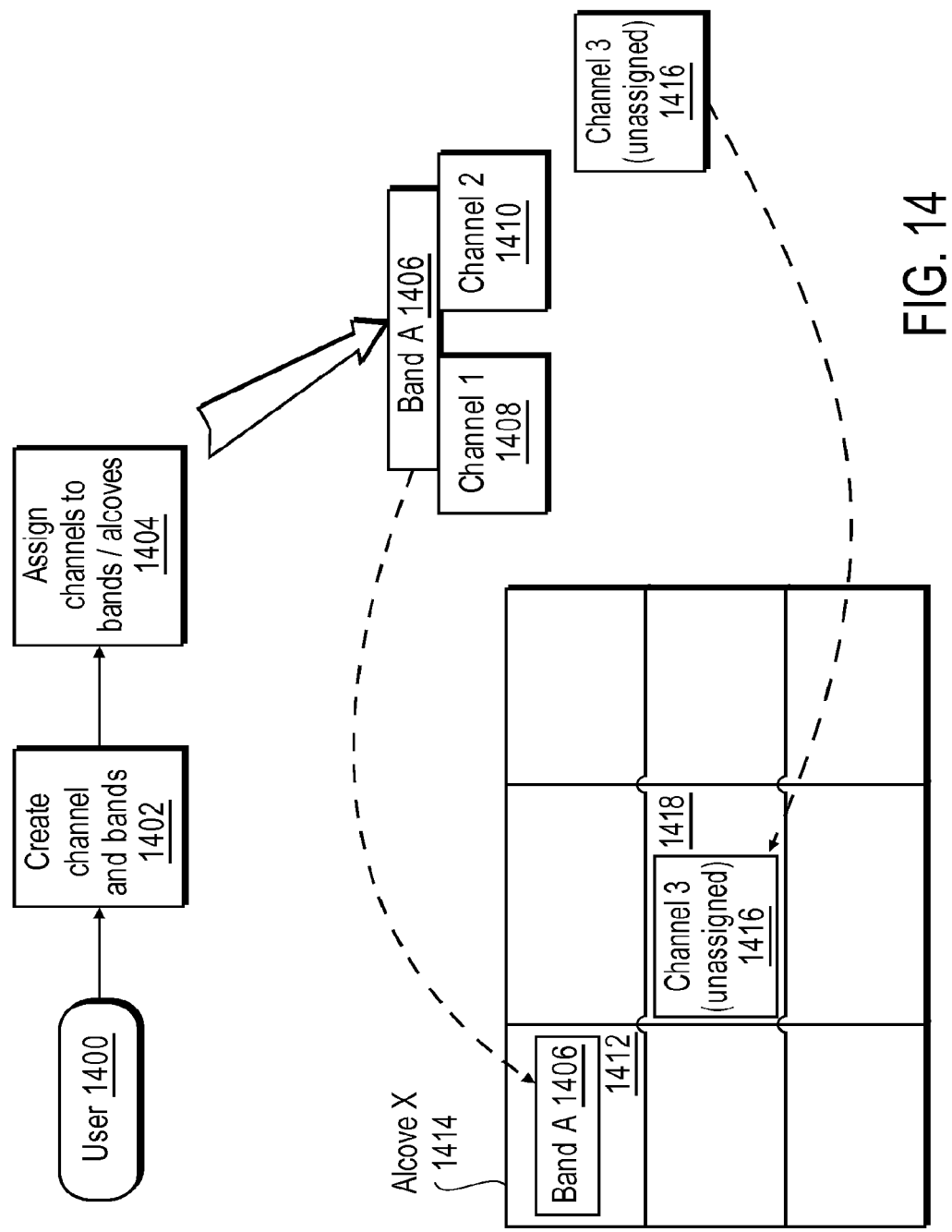

In addition, the drag and drop interface extends to the grid layout shown in FIGS. 3 and 4. To prepare the grid, Channels may be dragged and dropped into Bands by using an assignment interface exemplified in FIG. 6. Once Channels are assigned, Bands and Channels may be dragged and dropped into Alcoves, allowing for hierarchical construction of the user's Relationship Model without tedious, menu-driven allocations and commands. FIG. 14 illustrates this process. A user 1400 uses the system tools to create Channels and Bands 1402, and then assigns Channels to Bands/Alcoves as desired 1404. In the illustration, Channels 1 and 2, 1408 and 1410, respectively, have been assigned to Band A 1406, and Band A has been included in a cell 1412 of Alcove X 1414. Channel 3, 1416, is not assigned to any Band and is allocated to a cell 1418 of Alcove X directly. All of this can be done using familiar cursor control operations such as drags and drops.

Figure 6:
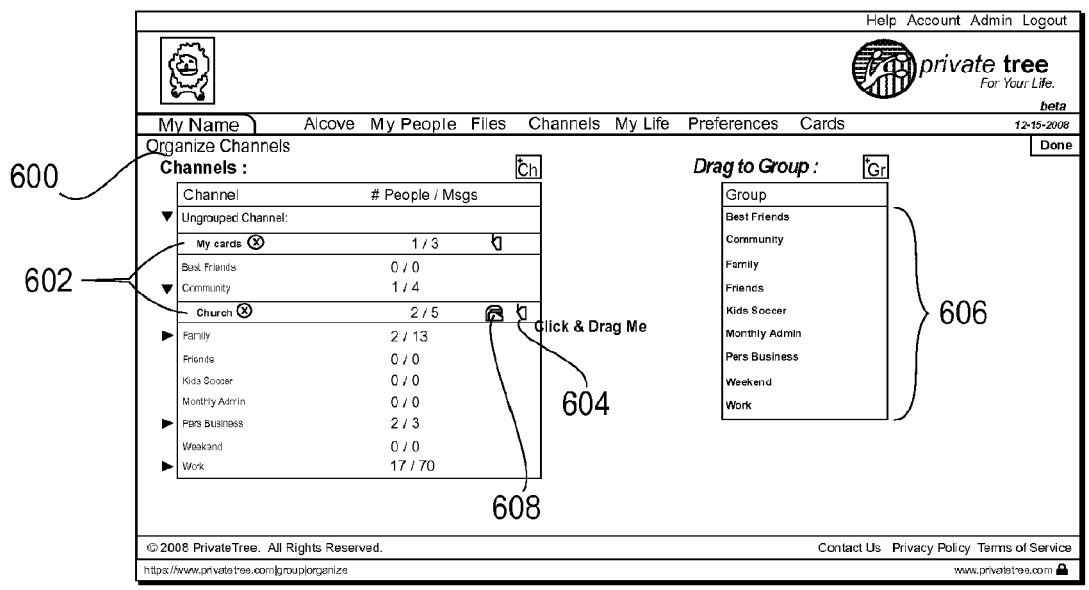
FIGS. 6 and 14 illustrate examples of the use of a drag and drop approach to facilitate organization of Channels and Bands according to an aspect of embodiments of the present invention.

Organizing Channels and Bands: The present system uses a drag and drop approach to facilitate organization of Channels and Bands. As shown in FIG. 6, through a Channel organization interface of the present system, Channel identifiers 602 may be dragged and dropped 604 (e.g., using a cursor control device at a client computer system) from the initial Band to any target Band 606. Channels may also be unassigned to free them from Band assignments 608. It is important to note here that Band assignments not only permit users to organize their Relationship Model, but are also used by the system to organize the overall interface in a rational fashion so the user has a customized, personalized view of that Relationship Model in the Alcove layers. This is in marked contrast to conventional social networking schemes, which force users to adopt a system-wide interface for organizing communications.

Figure 7:
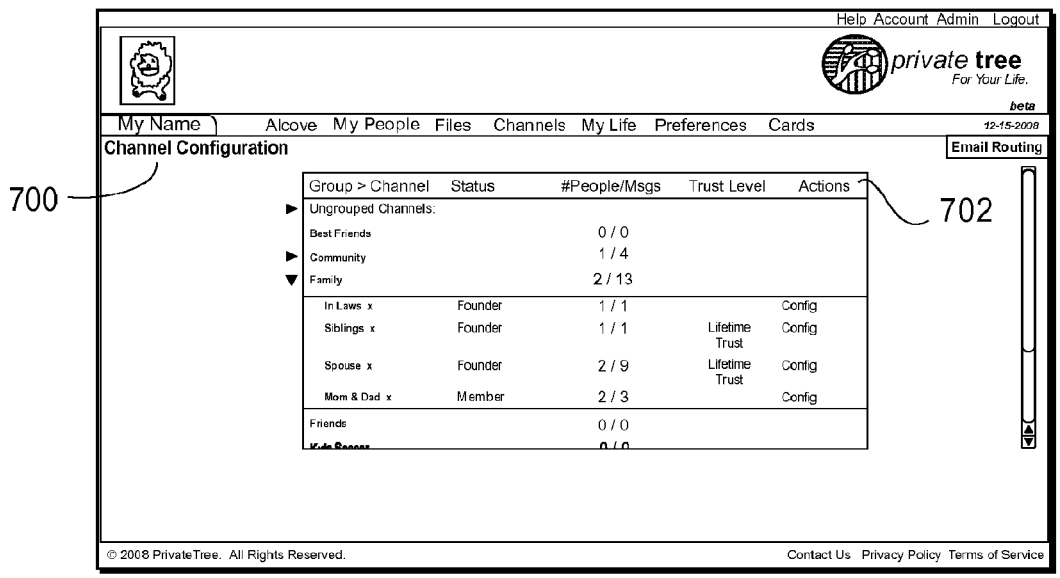
FIGS. 7 and 8 illustrate examples of Channel Manager interfaces according to aspects of embodiments of the present invention.

Configuring a Channel: As mentioned above, a Channel is a software object and thus has attributes such as permissions that dictate how the Channel behaves in the overall Relationship Model. These permissions may be configured by the user, for example by using a Channel Manager interface, 700 and 800, such as that shown in FIGS. 7 and 8, respectively. Among the kinds of attributes 702 that may be set or reported within the Channel Manager interface 700 are the control parameters of the Channel (e.g., moderated or un-moderated, privacy settings, e-mail permission, etc.), the number of people and/or number of messages associated with the Channel, the trust level of the Channel from the point of view of any member of the Channel, etc.

Figure 8:
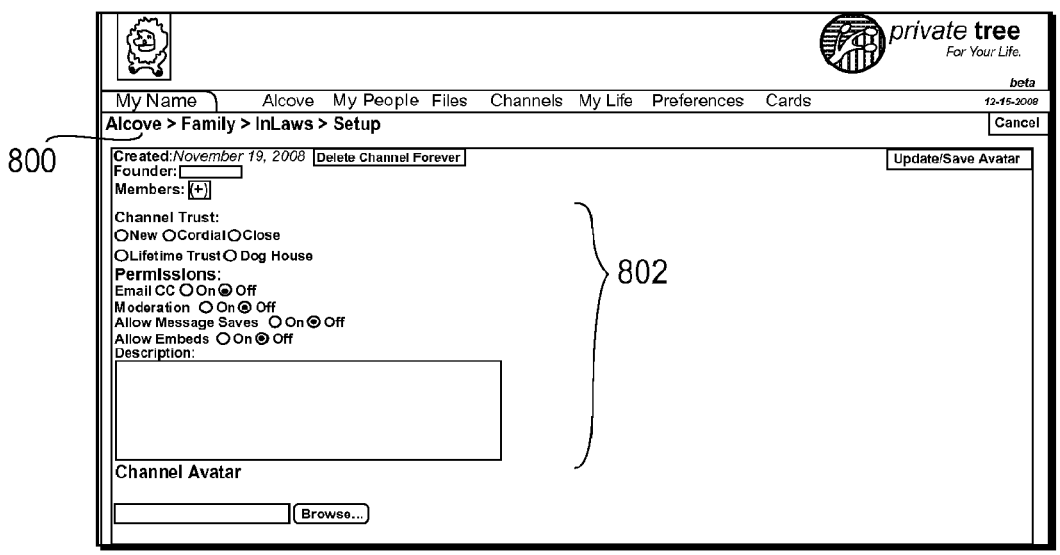

As shown in FIG. 8, Channels may be configured at a very granular level, allowing a user to set many attributes 802 for message storage and archiving, trust levels, and other attributes. A Channel may also have avatars or logos as attributes, which provide visual depictions of the relationship managed through the associated Channel. Channels can also be added and deleted using the Channel Manager. These configurations change the communications Channel from a monofilament link carrying information only, into an object that has attributes and user-directed intelligence as instantiated in the software. Each Channel can be directed to behave differently for each Channel User, according to his/her preferences. Thus, the Channel can automatically service the communications in ways this software system can enable.

Figure 9:
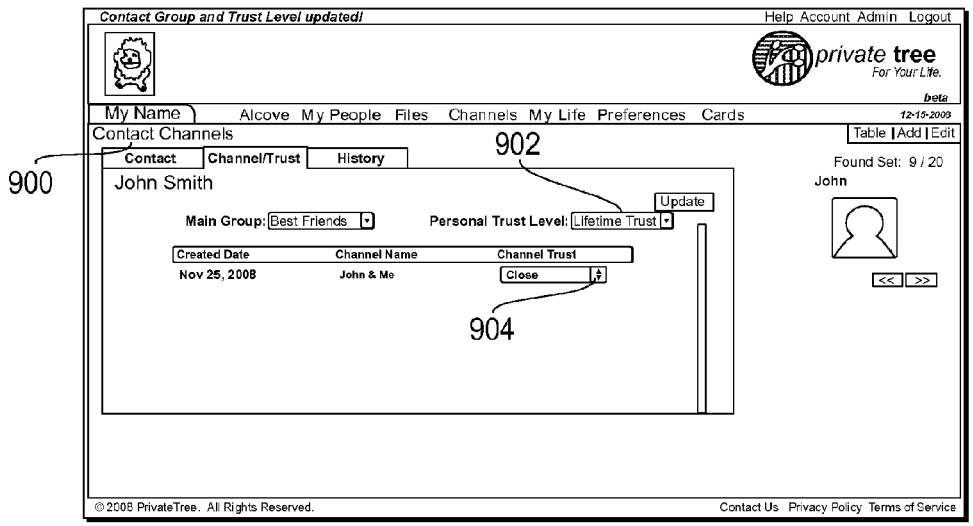
FIG. 9 illustrates an example of assigning different trust levels to Channels according to an aspect of embodiments of the present invention.
Figure 10:
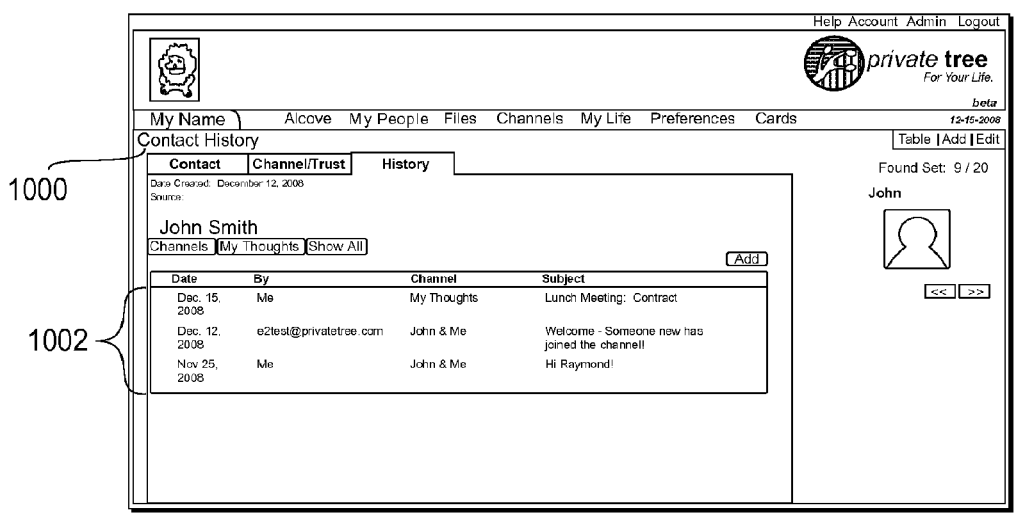
FIG. 10 illustrates an example of interface screens used by the present system allow a user to quickly review all historical communications with another person via Contact Records according to an aspect of embodiments of the present invention.

Contact Manager: Once a Host user has created a Channel, other people can be invited into the Channel. A Contact Record with attributes representing people is used by the present system, thus allowing the record to interact with the Channels. These attributes allow the system to interact with the Contact Record to assist the user in managing his or her relationships and communications with others. The present Contact Manager is unique in that it allows the user to inspect the number of Channels in which he/she participates with another person and to track the history of their mutual interactions. The Contact Manager also intelligently uses each system user's various e-mail addresses that they may use to represent their different online personas (work, personal, etc.) The system creates a unique identity for each user, and this identity may be addressed in the system by a user's relations through any of his/her e-mail addresses that he/she may already employ with these people in different facets of his/her life. Thus, system users can relate to one another using their different online personas, and only one user account is required. These attributes change the Contact Record from a flat data record into a software object. Thus, the Contact Record can represent a person and can then be automatically used in the communication that this software system manages. As shown in FIGS. 9 and 10, Contact Records and attributes regarding same can be managed and configured through various interfaces 900, 1000.

Trust Levels: The present system also allows a user to express his or her Personal Trust Level with another person by assigning it. They may also assign a Channel Trust Level to each Channel (see FIG. 9). This is important as it allows the system to model physical world relationship behaviors accurately. In general, people have varying levels of trust with other people, and they tend to moderate that trust depending on the context of the communication or the group of people who are present. Thus, in the present system, a Personal Trust Level 902 may be used to specify or establish a basic level of trust, and different trust levels 904 may be used to specify the context of trust in relationship situations and interactions in Channels, defined as Channel Trust levels. Channel Trust Levels may be especially useful when a user wishes to differentiate between trust of one person and trust of that person in the context of a group of people in a specific Channel. Thus, a user may have many trust levels with any one other person according to the context of the relationship, the different interactions with that person, and/or the audience of a particular communication. An example of this is how a person might trust someone in business or on a weekend adventure trip, where there might be a trust on economics and contracts in the case of business and a trust on skill and safety in the adventure trip.

Contact History and Status: As shown in FIG. 10, various interface screens used by the present system allow a user to quickly review all historical communications with another person via Contact Records 1002. All postings by the other person in a common Channel and all postings by the user to any common Channel are automatically tracked and reported. Over time, a user can assess for him/her-self the value of those communications, and thus, establish a direction for the relationship. The user may take private notes on the relationship to support relationship management. In some cases, quantitative information regarding the relationship (e.g., number or frequency of communication, length of messages, etc.) can be developed over time, which information may help the user make decisions on and apply constructive direction to a relationship.

Contact Records may be assigned different status, such as New, Active, Archive, etc. Further, Personal Trust Levels, Channel Trust Levels, and Channel status information may assist the user in determining where, over many relationships, to communicate content that is created by the user.

Inviting People into the user's Relationship Model: Once a Host user has created and configured a Channel, he or she may enter the Channel view screen and prepare a message. Inviting new Channel Users results in an e-mail invitation that includes a unique uniform resource locator (URL) being generated. The URL acts as a hyperlink that, when selected, navigates the invited person's browser to the site where the present system is hosted, where the invitee is afforded the opportunity to assign a password, and then read the message via the newly activated Host or Guest account.

Once an invitee joins the Channel, the Channel attributes are updated to reflect the addition of a new Channel user. This may include not only a Channel membership roll, but also encryption keys for the Channel in cases where the Channel is not one intended to be publicly available. Channels are thus dynamic objects that behave differently, from an automated administrative standpoint, based on the Channel membership roll.

Figure 21:
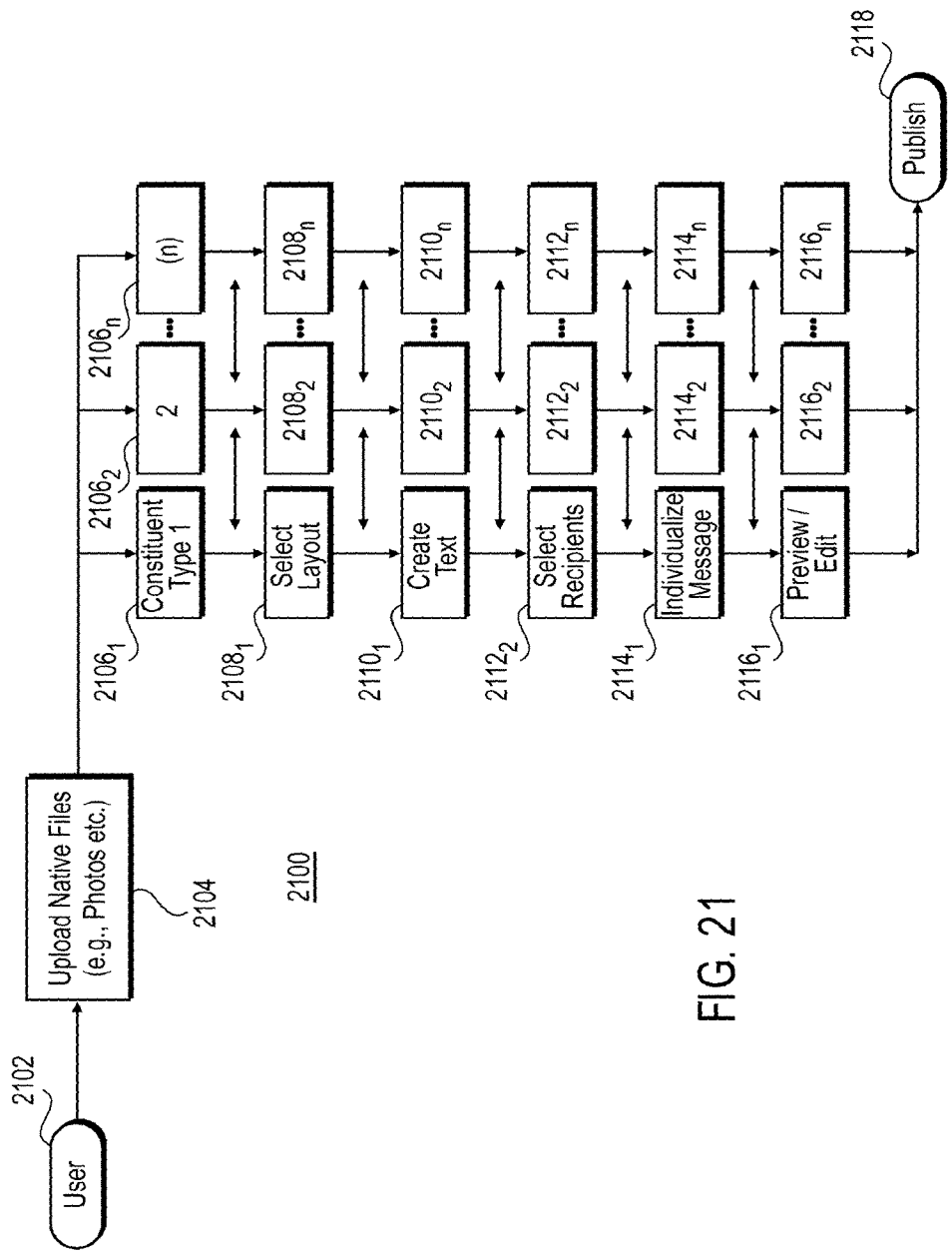
FIG. 21 illustrates an example of a greeting card preparation and customization procedure facilitated through the use of a system configured according to an embodiment of the present invention.

The Card System: Greeting cards are often important aspects of physical world relationships, and the present system allows a user to create greeting cards by uploading images that can be flexibly applied to a multitude of greeting card templates, appropriate to different types of recipients (e.g., family users, friends, professional colleagues, etc.). Referring to FIG. 21, the card system 2100 allows a user 2102 wishing to launch a greeting card campaign to upload native files 2104 such as photos or other files and rapidly construct individual cards for use with different constituencies $2106_1$-$2106_n$. Constituencies may be regarded as classifications for the user's contacts to which cards will be sent. For example, different constituencies may include family members, friends, professions that the user works with, teammates, etc. The constituencies may be user-definable.

Within each constituent type, the user may select a card layout $2108_1$-$2108_n$. That is, different layouts or card templates may be assigned to different constituencies. The layouts essentially define the look and feel of the card. For example, the layouts may include defined fields for text, images, etc. Fields for text may be segregated between fields for salutations, address, address name, body text, valediction, signature, etc. The system may provide default layouts or templates for these purposes (e.g., for popular constituencies such as friends and family), and may also facilitate user-definition of additional templates. Further, even the default templates can be customized $2110_1$-$2110_n$. For example, if a default template includes certain text (like a pre-printed message in a traditional greeting card), the system provides the user the ability to customize that text and have it apply across a constituency. Thus, the user need not edit every card for every member of a constituency.

As indicated by the horizontal arrows in the illustration, the card system user interface allows users to navigate across constituencies within a common context. Thus, the user can select layouts for each different constituency, before having or choosing to customize those templates.

After any customizing of the templates, users can select recipients, $2112_1$-$2112_n$, for each constituency. In some instances, the assignment of recipients to constituencies may be done in advance of any customization or template selection/customization as this may help a user determine what templates/messages will be appropriate. Further, earlier-created constituencies with existing contact lists may be saved and reused (e.g., annual holiday card lists), with optional updating of the lists to reflect changes in the user's relationships with the contacts, etc.

Finally, within each constituency, cards may be personalized $2114_1$-$2114_n$ for the intended recipient and a final review of the individual cards $2116_1$-$2116_n$ may be made prior to transmission to the recipient(s). Once all cards in a campaign are approved, the system will publish 2118 them into a "My Cards" Channel in the recipient's account, or may send the cards out in e-mail. On the receiving end, the present system is configured to allow the recipient to play a slideshow of received cards in the user's "My Cards" Channel, reducing the need for paper cards and improving the personal customization of a recipient's browser window.

The present system allows a user to flexibly change any element of his or her card design at many points in the creation process. This allows the user to quickly make and/or change decisions as the work product takes form. Also users are allowed to create targeted and differentiated messages to provide a different voice to the target audience(s), within the same campaign. Integrating the publishing into the Relationship Model mimics the real world where people tend to preserve messages of value so that they can be used or reviewed.

The Files Manager: The file system of the present system includes a native file upload capability that allows users to organize, tag and place system file attributes onto uploaded files. These attributes may include trust levels, reminders, text descriptions, written comments, body text, etc. to transform the uploaded file into a content object. Once content is rendered into content object form, the software tools used for interaction in the Relationship Model can make use of it.

Thus, a user may write a series of articles, tag them and determine for what type of audience the content is most suited. Once that is done, at a later time, the user may choose to publish the content into certain Channels, for example based on the context, Bands, trust levels (personal and Channel trust), etc. Thus, the present system assists users in managing and creating relevant content for their individual, physical world relationships.

Channel Operations: Channel operations facilitated by the present system include Create, Configure, Organize, Read and Write. A Channel reader and writer are used to present views of Channel postings and to create and edit postings, add reminders, moderate comments, and modify messages for content management.

Message Operations: Message operations facilitated by the present invention include Read, Write, Moderate, Draft, Reminder and Post. While reading, writing and drafts are straight forward, there are some things to note in connection with moderation, reminders, and posting.

In moderation, a Moderator may apply a denial message wrapped around a message object, and that object may be returned to its author. The author may edit and append additional comments and resubmit the post. Thus, a self-correcting system is created where a post either is pushed through to approved posting, or it is repeatedly returned to its sender by the Moderator until one party ends the process. This prevents database bloat with data orphans while modeling respectful social behavior and giving both the Moderator and the author the tools to make comments or negotiate what can be published.

Reminders allow a user to wrap any message with a set of notes and deadlines. So, messages that are in a Channel can be flagged for later action. Reminders may also be set to e-mail notices to a user.

Posting allows users to schedule their posts to protect their own privacy or make the posting time relevant or irrelevant, depending on the context of the post.

Virtual Channels: The present system allows for virtual Channels—aggregations of messages from different Channels into virtual Channels—to facilitate user review and user administrative actions. Examples of these virtual Channels are a moderation box, an InBox (for all inbound messages), an OutBox (for all posts by account holder), a Drafts box, and a Reminders box. These are self-explanatory.

E-mail Routing: The present system performs two types of e-mail routing, inbound and outbound (as referenced to a user's Relationship Model). Outbound routing may be used by users to echo (or replicate) Channel postings into e-mail that is sent onto mobile devices or other platforms. This is less secure, but it allows users to establish ties with people who prefer to use mobile or other methods to receive and send messaging. The outbound permissions are determined by the Moderator at the Channel level, and each Channel User may select whether this operation is enabled or not for him/her-self and, if enabled, set the appropriate e-mail address for delivery. Inbound routing allows users to create e-mail addresses that are context-specific, to deal with the explosion of e-mail use by all entities with whom individuals must relate. For example, individuals are often asked for e-mail addresses by retailers, service providers and others, but it is often the case that that information is shared with others whom the individual may not know or approve. The present system permits users to track use of their e-mail addresses by monitoring communications on an e-mail address-by-e-mail address basis to determine whether any otherwise trusted parties have inappropriately shared this information with third parties. If the e-mail address is abused, the user can simply generate a new one.

These inbound e-mails may be changed through a regeneration process, and each Channel can thus be addressed and different inbound e-mails can be contextualized for the user. Each Channel has a list of approved senders to the Channel to enable blocking of unauthorized messages. This is more efficient than e-mail filtering rules, because all of the inbound messages are managed according to the user's Relationship Model, and only approved senders in context with a Channel's purpose can send to that Channel. The user will be able to parse and prioritize his or her messages much more efficiently because the system performs a preliminary sort based on the user's Relationship Model. The e-mail routing system places e-mail multiplexing in an easy to understand user interface and, as part of the present system, becomes a powerful tool for improving message organization and responsiveness due to the recipient being more attentive to pre-parsed and desired-context communications at any one time, organized in their Alcoves preferentially according to their Relationship Model.

Each Channel can manage both inbound and outbound e-mails. The outbound e-mails are delivered to addresses specified by Channel Users as contact addresses. The inbound e-mail addresses are generated for each user, according to a user-specified alias for the Channel. By allowing each Channel User to set an alias and generate an inbound e-mail address for that Channel based on the user's alias, the present system facilitates integration with a user's e-mail software's address book and any auto-complete on e-mails. Reply messages to a Channel by different Channel Users will properly address the subject Channel because the system parses the root part of the e-mail address to identify a Channel and then matches the sender to a Channel membership roll or inbound list to prevent postings by unauthorized persons.

Figure 11:
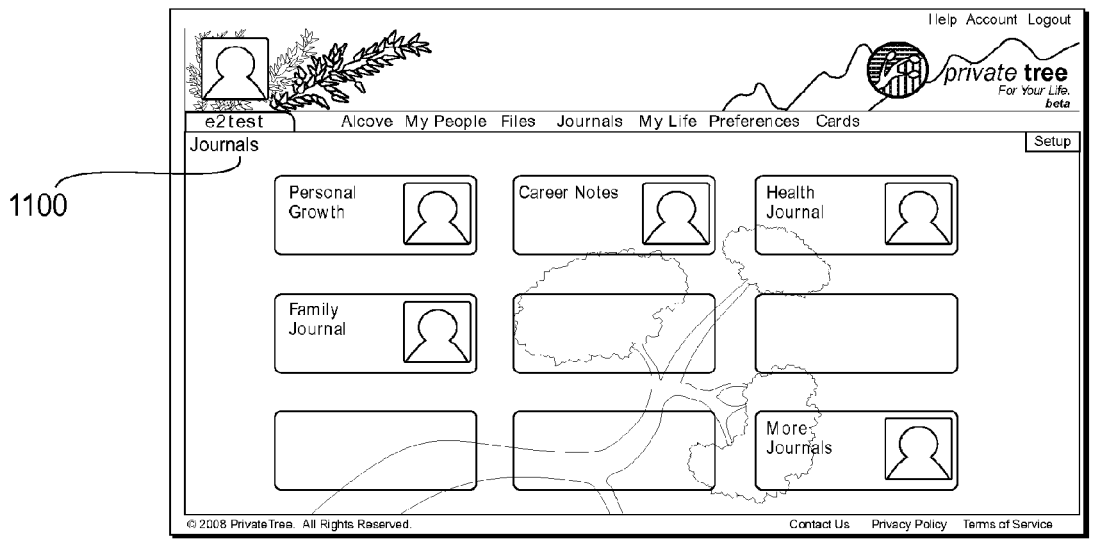
FIG. 11 illustrates an example of a system interface for a user's one-to-zero relationship with him/her-self according to an aspect of embodiments of the present invention.

A User's Private Life: As shown in FIG. 11, the present system includes an interface 1100 for a user's one-to-zero relationship with him/her-self. This "My Life" section allows an individual to record information concerning his/her own life. This is helpful for people seeking self-improvement or to mark the key emotional moments in their own lives. Instantiated in this section may be a journaling function, where the user may keep personal notes regarding a variety of topics, or an archive for later sharing with others (such as children, etc.)

Security: The present system is, in essence, a context sensitive communications tool, and, as such, needs to provide security for all users. Channel content can be encrypted and the encryption keys used for such processes can be generated dynamically. For example, Channel keys can be produced using individual Channel Users' account passwords. Thus, when a Channel experiences a change in its membership roll, the then-current Channel key will automatically be updated, ensuring that former Channel Users can no longer access the Channel. These security measures are transparent to the remaining Channel Users.

In one example of this scheme, user accounts may be secured against eavesdropping by requiring users to create an account password (or log-in password). The passwords may be required to meet certain criteria, such as a minimum length, use of alphanumeric and non-alphanumeric characters, etc. To guard against inadvertent disclosure of the account passwords to unauthorized users, the system stores only a representation, for example, a cryptographic hash (e.g., SHA-1), of the account password.

Upon creation of the account password, the system generates a public/private key pair for the user. The private key is encrypted using the user's account password. The user-specific public/private key pair can be used by the user to encrypt information as desired.

Further, when a user wishes to secure information, such as messages, in a Channel, a Channel-specific public/private key pair and password are generated by the system. The Channel-specific private key is encrypted using the Channel password, and the Channel password is encrypted using the public key of all Channel Users (i.e., all users that should have access to the respective Channel). When information is to be stored securely in a Channel, it is encrypted using the Channel-specific public key (in some instances it may be individual files that are so encrypted while in other instances it may be an entire Channel that is secured in this fashion).

Now, when a user wishes to access the secured data/Channel, the system prompts the user for his/her account password and, upon presentation thereof, computes and verifies the cryptographic hash of the account password. If the account password is verified, the user's private key is decrypted using the user's account password. The Channel password is then decrypted using the user's private key. Using the Channel password, the Channel-specific private key is decrypted and this is used to decrypt the data/Channel for presentation to the user. This methodology preserves the confidentiality of all keys and account passwords and can be extended to any number of Channels, data elements within Channels and users.

A summary of the keys/passwords maintained by the system is given below. In this example, Channels store messages, which include content (e.g., the text of a message) and data elements (e.g., files, etc.). Individual content items have associated content identifiers. The various tables and the objects stored in the tables referred to below may be stored on a server, such as server 202, or on a separate storage device (e.g., database 204) accessible to the server.

User Table:

| User name | Account password hash | User's private key (encrypted with account password) | User's public key |
|---|---|---|---|

Channel Membership Table:

| Channel name | User name | Channel's private key password (encrypted with user's public key; decryptable only with user's private key) |
|---|---|---|

Channel Table:

| Channel name | Channel private key (encrypted with Channel password | Channel's public key |
|---|---|---|

Message Table:

| Channel name | Content identifier | Content key (encrypted with channel's public key) |
|---|---|---|

Content Table:

| Key (encrypted with user's public key | Data element (encrypted with key) |
|---|---|

As between the clients and the server at which the present application is hosted, conventional security measures may be employed. For example, communications may be encrypted using secure sockets layer (SSL) in which encryption keys are based on digital certificates exchanged between the client and the server at the beginning of a session.

Figure 12:
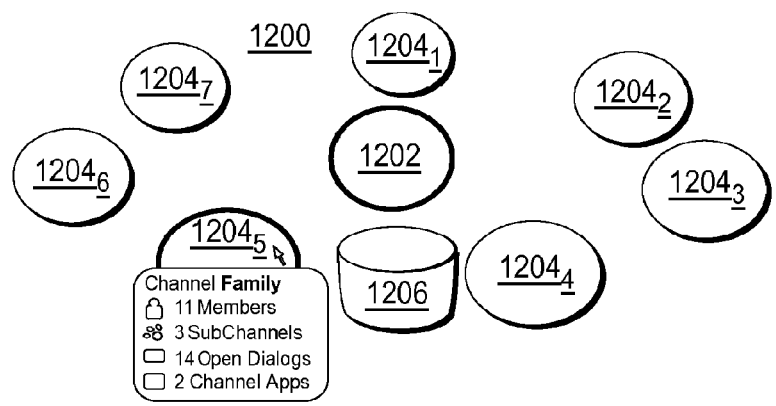
FIG. 12 illustrates an example of a three-dimensional view of a user's Relationship Model according to an aspect of embodiments of the present invention.

Other Views: While the grid or array-based views discussed above afford some useful means of organizing Channels and other constructs, other views are contemplated for use in connection with the present invention. For example, a three-dimensional view such as that shown in FIG. 12 allows the Relationship Model 1200 to reflect dynamic interactions between people in a user's world. With the user 1202 at the center of that world, Channels 1204 or other constructs 1206 may be represented as spheres of influence or communication. Spheres may be coded (e.g., by color, size, etc.) to reflect the user's relationship, communications flow and/or influence within the corresponding relationship construct. Likewise, Channel posting frequency or other attributes may be used to graphically show which relationships are more vibrant, or more active at any given time.

Figure 13:
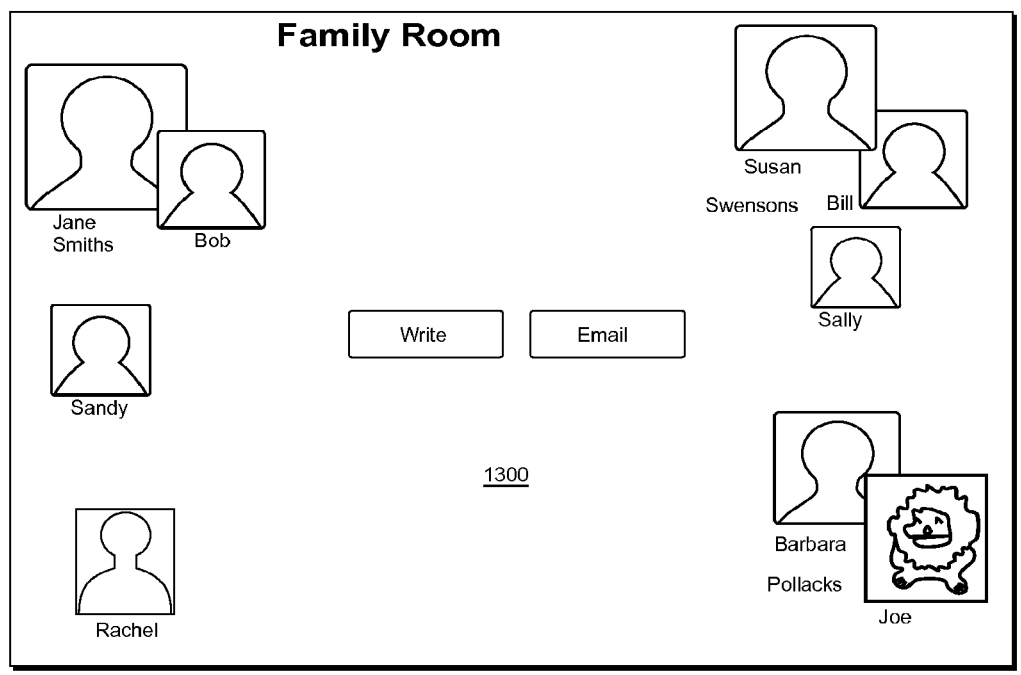
FIG. 13 illustrates a Room View according to an aspect of embodiments of the present invention.

Another useful view is a Room View 1300 as shown in FIG. 13. When a group of people become familiar with one another, as with families and old friends, they may prefer to use a Room View, which is a representation of the users in a Channel in a two dimensional visual form. Such a view allows Channel Users to feel as though they are visiting a group of friends, and it allows users to parse data and perform operations quickly and efficiently. Of course, other interfaces can be supported in private, contextualized fashions.

Having thus described the architecture of the present system, some discussion of how users make use of the system can be presented. As indicated, the paradigm provided by the present system is one of managed personal and business relationships as represented by rooms (Channels). Upon creating an account (either through independent registration, responding to an invitation or greeting card solicitation, or otherwise), and logging in to that account (using a user name/password authentication), Host users can begin to create Rooms (Channels) (e.g., using wizards or menu options as explained above) and, optionally, group them into Bands. Each Room (Channel) represents a communication portal with others that the user has a relationship with. Once a Room has been established, the user can invite others into the Room—i.e., to use the Room as a means for exchanging controlled communications or archiving information with the user.

Figure 15:
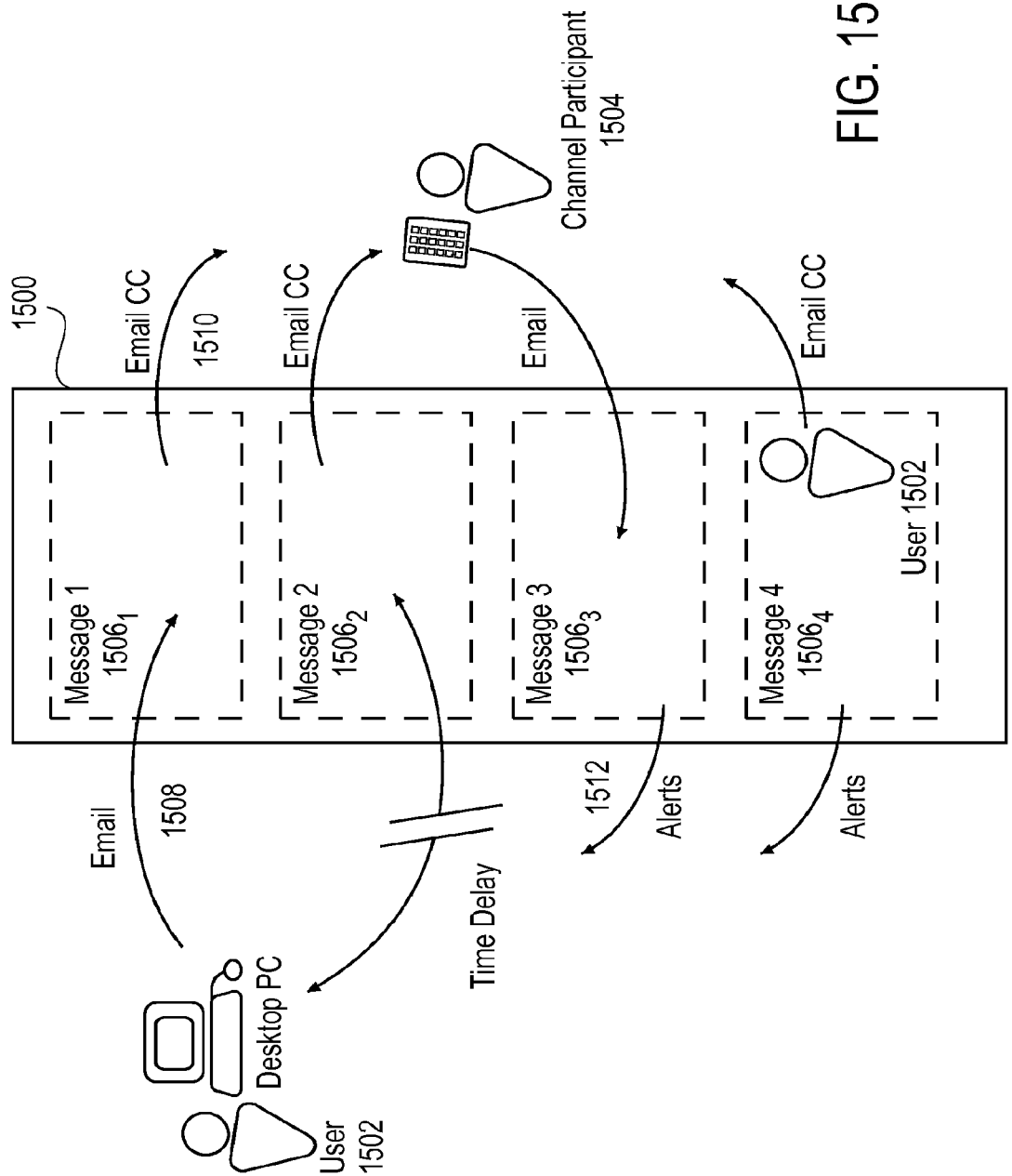
FIG. 15 illustrates an example of content being organized within a room such that the room acts as an archive for an ongoing discussion between room members according to an aspect of embodiments of the present invention.

Content (e.g., messages, documents, files, etc.) can be posted to rooms in a variety of ways. For example, users and other room members, whether as registered users or guests, can submit e-mails to a room (e.g., from a personal computer or mobile device) or can post messages directly to a room when logged in to the system. The messages can be text, and optionally can include attachments such as files, images, movies, or other content items. Within the room, the content is organized chronologically (or in an alternative fashion according to the user's preferences for content layout specified at the time the room is created or as modified thereafter), and so the room acts as an archive for an ongoing discussion between the room members. This concept is illustrated in FIG. 15.

As shown in this illustration, a room 1500 acts as an archive for a conversation (or Thread) between a user 1502 and another individual 1504 with whom the user has a relationship. In this example, the oldest message $1506_1$ appears at the top of the room and the newest message $1506_4$ appears at the bottom of the room, but this organization can be reversed, with the newest message appearing at the top and the oldest message at the bottom. As conversations lengthen, the room may be segregated into different pages so that page views can load quickly in a browser.

In this example, message $1506_1$ was posted to the room via an e-mail 1508 from user 1502. Upon such posting, a notification 1510 indicating that new content is available in room 1500 is sent to the other room participant 1504. This may be an e-mail notification to an e-mail address specified by participant 1504 or another form of notice such as an e-mail carbon copy. Likewise, message $1506_2$ was posted via an e-mail from the user 1502, but this time the posting was set to occur at a specified time after the user had submitted the e-mail. This allows the user to control the release of content within a room. In response to message $1506_2$, the other room participant 1504 posted a reply message $1506_3$, and user 1502 was notified 1512 of same.

The next message $1506_4$ was posted by user 1502 after logging in to his/her account and entering the room. An e-mail notification in alert form is sent to user 1502 and e-mail carbon copy to user 1504. Thus, the conversation between the room participants can be carried on in an organized manner and at times selected by the participants. Of course, there may be more than two participants in a conversation. In this way, a Channel is acting as a communications router with time buffers, security, and an automatic archive. When combined with each user's Relationship Model, these messages and archives are automatically organized, thereby reducing administrative burden on the participants.

Figure 16:
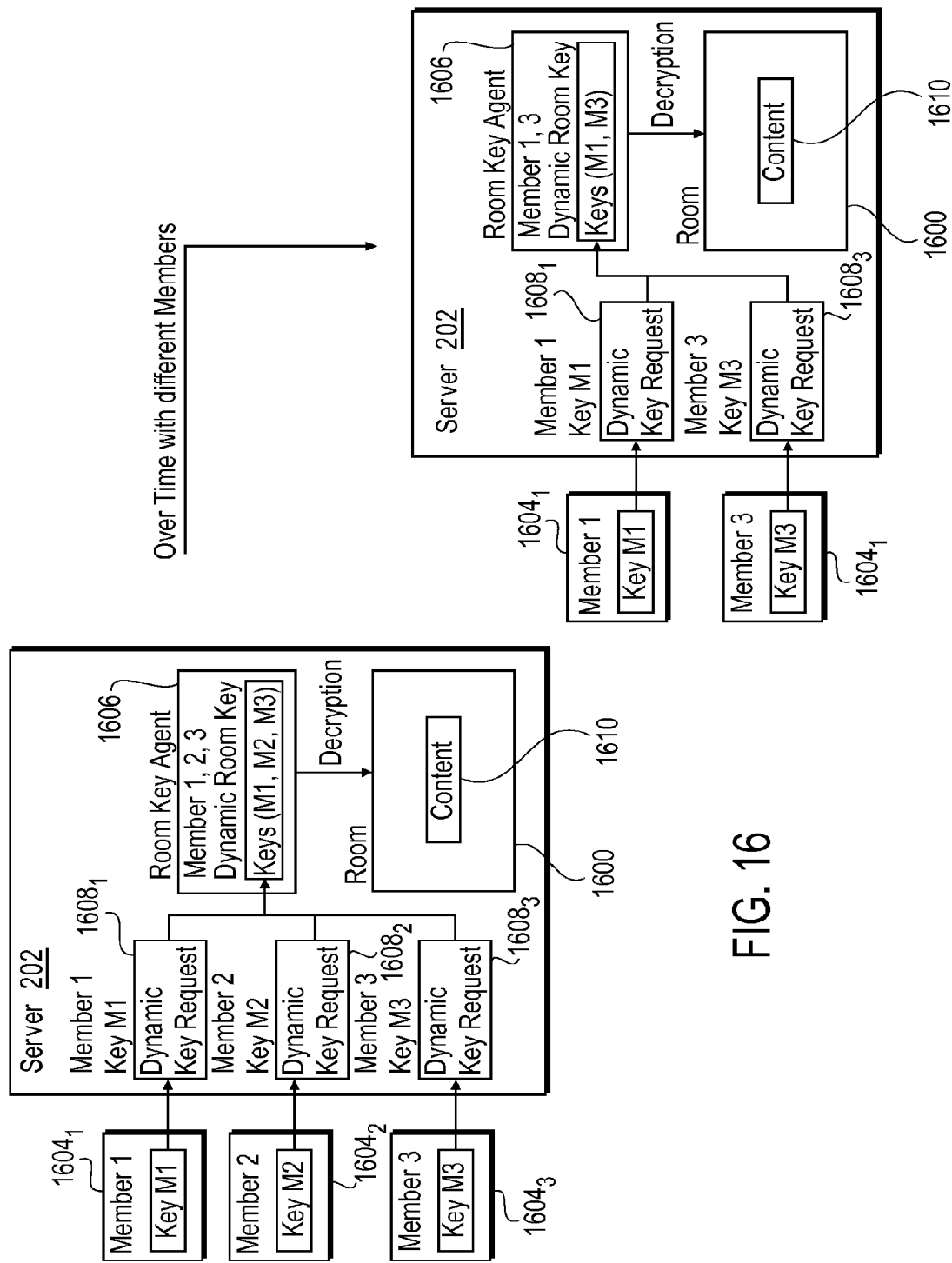
FIGS. 16 and 18 illustrate examples of the use of dynamic room keys according to an aspect of embodiments of the present invention.

As mentioned above, in addition to being organized, Channel content can be encrypted and the encryption keys used for such processes can be generated dynamically. As shown in FIG. 16, for each room 1600, Channel- or Room-specific keys are generated by a Room Key Agent 1606 using individual Channel Users' account passwords $1604_1$-$1604_3$ as discussed above and in response to key requests 1608 as each user joins or leaves a room. Thus, when a Channel experiences a change in its membership, for example going from three members to two members, the then-current Room-specific encryption key will be updated, ensuring that former Channel Users can no longer access the room and the content 1610 therein. This change is transparent to the remaining Channel Users because the new keys are based on the users' unchanging account passwords.

Figure 18:
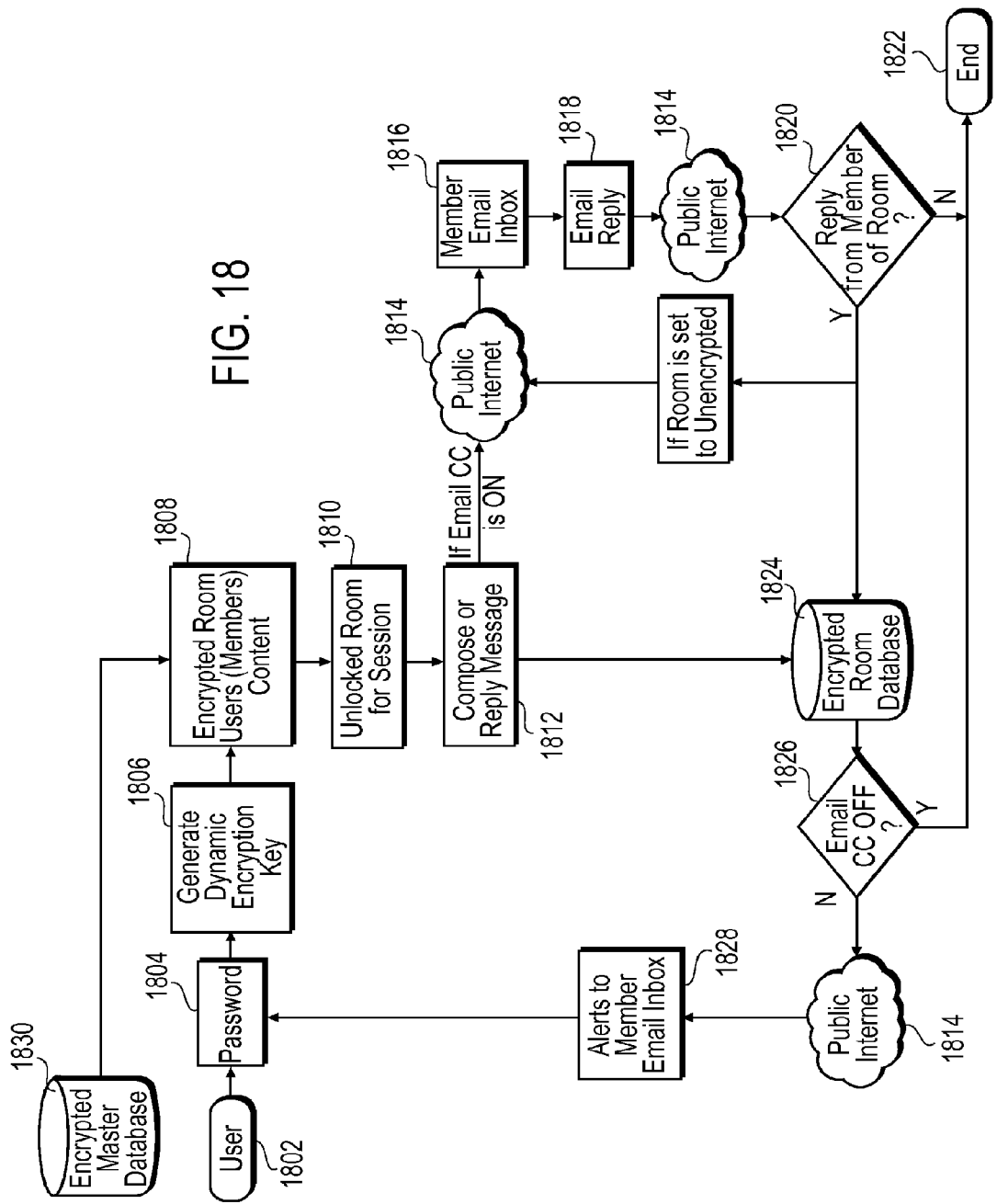

The use of the dynamic Channel-specific keys is further illustrated in the flow diagram shown in FIG. 18. In this example, a user 1802 logs in to his/her account using an account password 1804. The user's account password is used to create (if no key for the room yet exists) or obtain (if the key does already exist) a Channel-specific key 1806, which allows the user to access a room 1808 in which content shared with other room participants is available. The Channel-specific key unlocks the room 1810 and provides the user with the ability to read and reply to messages 1812. The room contents are retrieved from a master database 1830.

For each new post created by the user, if the Room is configured to send e-mail copies of the post to other room participants, these e-mails are sent via the public Internet 1814 to each individual participant's e-mail inbox. From that e-mail account, the participant may reply to the post 1818, and that reply will be routed over the Internet to the server at which the present system is hosted. At the server, the reply is checked to see if it originated from a recognized member of a room 1820 and if not the process quits 1822. If the reply is from a recognized member of a room, that reply is added to the room 1824 in the context of the on-going conversation and, because e-mail copies are being sent from this room 1826, a copy of the reply (or an alert indicating the reply is available in the room, depending on the user's room settings) is also sent to the original user's e-mail account 1828. Notice that the original post 1812 was also added to the room 1824 in the conversation. As messages are posted to rooms, reminders may be set or attached, for example where the message requires action on the part of a room member. If the Room is not configured to send email copies through the public Internet, but rather to keep messages within a Room or route internally in the system, then the system is ideal to allow users to rescind messages that are possibly due to mistakes or were written in emotional states that have passed. These Rooms may also allow for automatic erasure of messages to mimic the privacies that are allowed in conversation, thereby increasing truthfulness and relevance in communications.

Thus, methods and systems for facilitating relationship management have been described. Although discussed with reference to several illustrated embodiments, the present invention is not intended to be limited thereby. For example, various embodiments of the present invention may be implemented with the aid of computer-implemented processes or methods (a.k.a. programs or routines) that may be rendered in any computer-readable language. Accordingly, it should be appreciated that the foregoing description of algorithms and symbolic representations of operations on data refer to operations on data stored within a computer-readable storage device. Such quantities typically take the form of electrical or magnetic signals stored, transferred, combined, compared and otherwise manipulated by a processor communicatively coupled to the computer-readable storage device and under the control of computer-readable instructions which themselves may be stored and read from the same or a different computer-readable storage device. It should be appreciated that throughout the forgoing description of the present invention, use of terms such as "processing", "computing", "calculating", "determining", "generating", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Examples of computer-readable storage devices/mediums include any type of disk (e.g., floppy disks, optical disks, compact disks (CDs), compact disk read only memories (CD-ROMs), read/write disks (CDRWs), hard disks, magneto-optical disks), read-only memories (ROMs), random access memories (RAMs), erasable programmable ROMs (EPROMs), electrically erasable programmable ROMs (EEPROMs), flash memories, or other types of storage media suitable for storing electronic instructions, and for coupling to a computer processor via a communications path such as a bus.

The algorithms and processes presented herein are not inherently related to any particular computer or other apparatus. Various computer systems may be used in accordance with the teachings herein by suitably programming the computer system to operate in the above-described fashion. By so programming the computer system, the computer system in essence becomes a special purpose machine configured to carry out the operations discussed above. Alternatively, the methods discussed above can be implemented in hard-wired circuitry or a combination of hard-wired circuitry and a programmed computer system.

What is claimed is:

1. A system comprising:
a server having a processor and a computer-readable storage device coupled to the processor, the storage device storing computer-readable instructions, which instructions when executed by the processor configure the server to organize messages exchanged among users of a computer-based relationship management system within user-defined, secure communication channels hierarchically organized according to user-defined categories that represent the users' views of their personal relationships with one another, the messages being stored in a data store accessible to the server and each message being automatically deleted from the data store when a user determined event occurs, wherein:

(i) security of the communication channels and information stored within the communication channels is maintained using channel-specific public/private key pairs, each of the channel-specific public/private key pairs comprising a channel-specific public key and a channel-specific private key, (ii) each of said channel-specific private keys is uniquely associated with a respective one of said communications channels, and is encrypted by a channel password, (iii) each of the channel passwords is encrypted by a public key of all of the users, (iv) a first one of the channel-specific public keys is used to encrypt information stored within a first one of the communication channels, and (v) a first one of the channel-specific private keys corresponding to the first channel-specific public key is used to decrypt an encrypted version of the information stored within the first communication channel; and one or more clients communicatively coupled to the server via one or more networks.

* * * * *